(12) United States Patent
Sommer et al.

(10) Patent No.: US 6,628,886 B2
(45) Date of Patent: Sep. 30, 2003

(54) INTEGRATED PROCESSING SYSTEM FOR OPTICAL DEVICES

(75) Inventors: Phillip R. Sommer, Newark, CA (US); Alexander Brudny, Saratoga, CA (US); David Proscia, San Ramon, CA (US); David Harvey, Sunol, CA (US); Halbert Tam, Santa Clara, CA (US)

(73) Assignee: IPhotonics, Inc., Glen Burnie, MD (US)

( * ) Notice: Subject to any disclaimer, the term of this patent is extended or adjusted under 35 U.S.C. 154(b) by 0 days.

(21) Appl. No.: 10/038,093

(22) Filed: Jan. 4, 2002

(65) Prior Publication Data

US 2003/0128959 A1 Jul. 10, 2003

(51) Int. Cl.[7] .................................................. G02B 6/00
(52) U.S. Cl. ........................ 385/147; 385/134; 385/135; 385/136; 385/137
(58) Field of Search ................................ 385/134, 135, 385/136, 147, 137

(56) References Cited

U.S. PATENT DOCUMENTS

| | | | | |
|---|---|---|---|---|
| 5,790,739 A | * | 8/1998 | Strause ........................ 385/135 |
| 5,793,909 A | * | 8/1998 | Leone et al. ................... 385/24 |
| 5,816,896 A | | 10/1998 | Schouwenaars ............... 451/41 |
| 5,980,367 A | | 11/1999 | Metcalf ....................... 451/285 |
| 6,314,230 B1 | * | 11/2001 | Daoud et al. ................ 385/135 |
| 6,368,189 B1 | | 4/2002 | Maloney et al. .............. 451/41 |
| 6,368,193 B1 | | 4/2002 | Carlson et al. ................ 451/66 |
| 6,385,381 B1 | * | 5/2002 | Janus et al. .................. 385/135 |
| 6,396,991 B1 | * | 5/2002 | Wislinski et al. ............ 385/135 |
| 6,445,866 B1 | * | 9/2002 | Clairadin et al. ............ 385/137 |
| 6,493,501 B2 | * | 12/2002 | Flores et al. ................. 385/135 |
| 6,519,407 B1 | * | 2/2003 | Kawase et al. .............. 385/147 |

* cited by examiner

*Primary Examiner*—Akm Enayet Ullah
*Assistant Examiner*—Jennifer Doan
(74) *Attorney, Agent, or Firm*—Whiteford, Taylor & Preston L.L.P.

(57) ABSTRACT

The invention provides a method and apparatus to process and assemble optical subsystems. In one aspect, the optical subsystems are placed on a carrier apparatus adapted to support a plurality of the optical subsystems in a desired process orientation and with a desired spacing to provide high process throughput. In one aspect of the invention, optical components are assembled and sequentially processed in various steps, such as component installation, optical fiber preparation, component attachment, fiber trim, optical fiber polishing, and optical component testing to produce a finished optical subsystem.

65 Claims, 35 Drawing Sheets

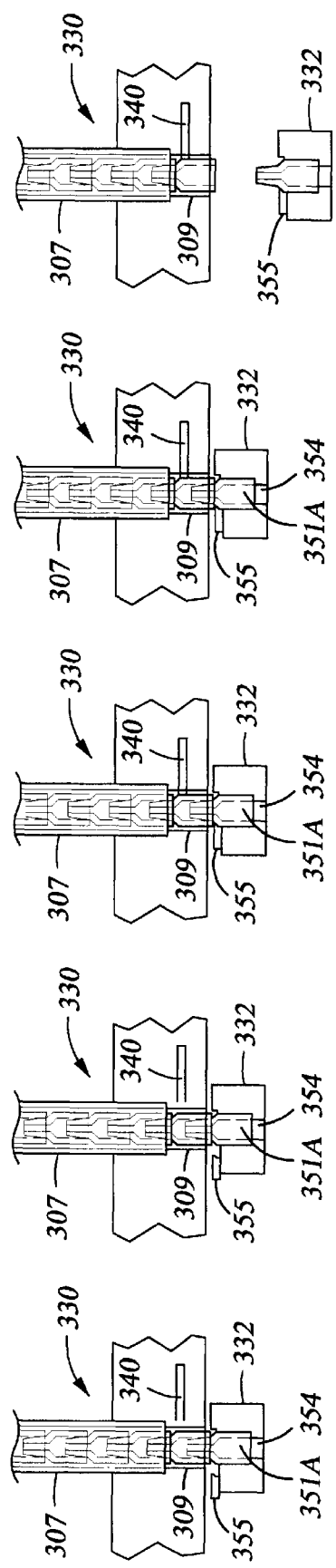
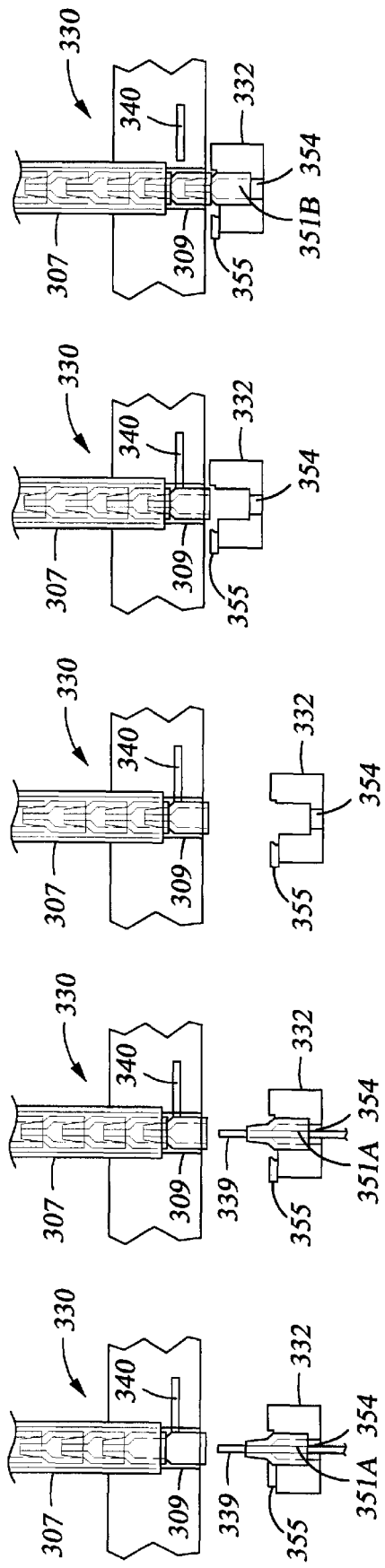

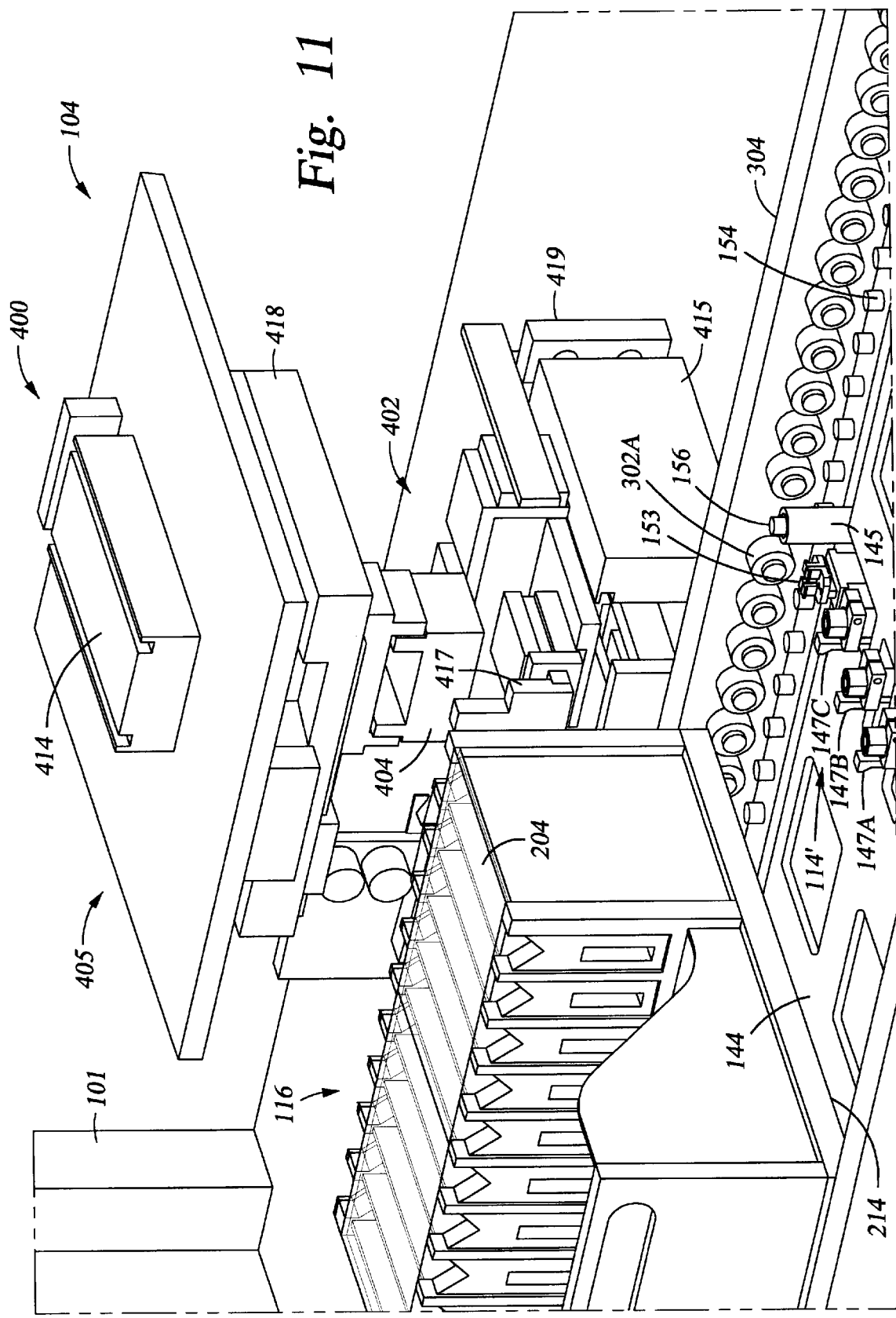

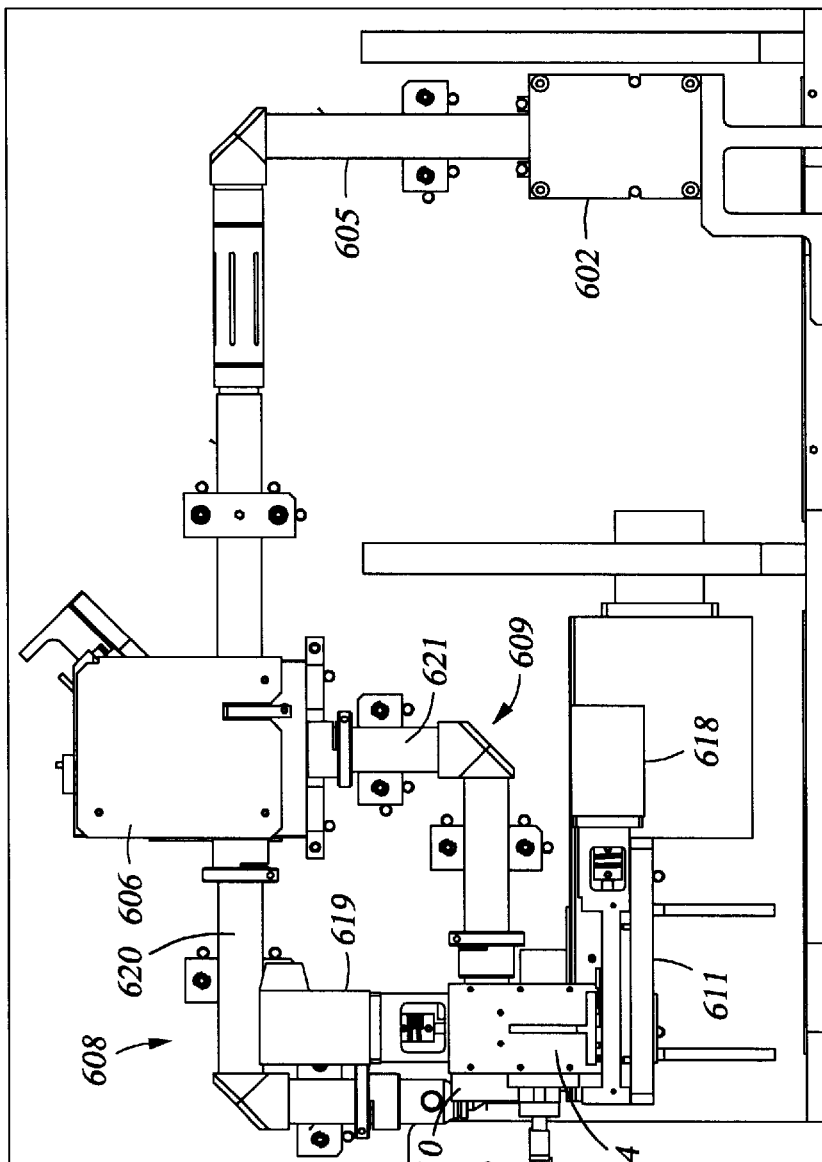
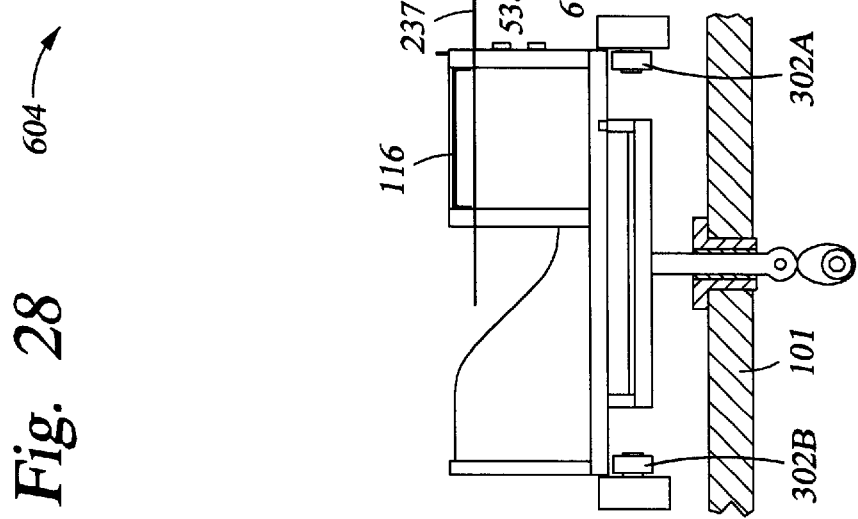
Fig. 28

INTEGRATED PROCESSING SYSTEM FOR OPTICAL DEVICES

BACKGROUND OF THE INVENTION

1. Field of the Invention

The invention generally relates to a method and apparatus for assembling optical subsystems or optical interconnections.

2. Background of the Related Art

In the manufacture of fiber optic communication systems, optical interconnects and other components are assembled to form various interconnected optical subsystems. Typically, optical components are integrated into optical subsystems that collectively create, for example, an optical switch. As the communication industry's need for optical communication bandwidth has increased, the ability for interconnect surfaces to provide a precise connection between optical subsystems is becoming critical, especially with regard to optical transmission modes that use multiple wavelengths of light to transmit information, such as Dense Wavelength Division Multiplexing (DWDM), for example. DWDM is a fiber-optic transmission technique that employs multiple light wavelengths to transmit data in a parallel-by-bit or serial-by-character format. DWDM is a major component of most optical networks that allows the transmission of e-mail, video, multimedia, data, voice—carried in Internet protocol (IP), asynchronous transfer mode (ATM), and synchronous optical network/synchronous digital hierarchy (SONET/SDH), respectively, over fiber optic communication systems.

Generally, fiber optic interconnections include two individual optical terminations mated together to provide a unitary and continuous optical path therethrough. Conventionally, to form an optical interconnect interface, fiber optic cables are terminated into an optical interconnection called a ferrule that is adapted to connect or mate the optical cables together. Ideally, optical interconnects, such as ferrules, are manufactured with precisely polished and dimensionally optimized interconnect surfaces to provide low insertion loss and to prevent reflected transmission. Generally, optical interconnects are assembled in stages as subassemblies using a combination of a robotic assembly (e.g., pick and place robotics) and/or by hand. Generally, as each assembly stage is finished, the subassemblies are stored as work in process (WIP) elements and/or pieces in a processing storage bin, awaiting the next process step. Unfortunately, optical components are often mishandled by assembly personnel and are often left in the process bin unprotected. Therefore, the conventional assembly processes often lead to incorrectly assembled or damaged optical components, which may lead to optical system performance and/or optical system interconnection issues. For example, a damaged or improperly assembled optical component may cause mechanical interface difficulties, poor specification repeatability, poor reliability, and undesirable interface aberrations, such as improper radius of curvature and apex offset, for example, which often affect insertion loss, light polarization, extinction ratio, return loss performance, etc. Moreover, staged subassembly processing systems are often inefficient, as the subassemblies often must wait long periods for the next process step requiring a larger than necessary WIP to maintain and adequate throughput.

Typically, interconnection inefficiencies are overcome by additional equipment, such as repeaters. Generally, repeaters amplify the optical signal to overcome insertion loss and signal attenuation, thereby extending the optical signal broadcast range. Additionally, testing equipment such as an interferometer may be used to precisely test, for example, the radius of curvature and apex offset. The radius of curvature is the radius of the interconnect surface, and is critical for proper mating of interconnect surfaces. The apex offset is the measure of the interconnect optical path alignment and is critical for the proper alignment of the optical paths between two optical interconnect surfaces. Unfortunately, as the optical subassemblies are assembled, the damage caused by the assembly processes must be accounted for and tested. Moreover, testing each interconnection and subassembly for parameters such as radius of curvature and apex offset increases the manufacturing time, and thus, the cost of the optical subassemblies. Further, for large fiber optic communication systems employing thousands of optical interconnections, using equipment such as repeaters designed to overcome the interconnect inefficiencies may lead to an overall increase in the cost of the fiber optic communication system. Thus, having damaged or improperly assembled optical components affects the transmission of light, which affects information flow, reduces the system bandwidth, reduces the system efficiency, increases equipment costs, and generally increases the cost of the communication system.

Therefore, there is a need for a method and apparatus to provide a system for assembling optical components and subassemblies in a simple, repeatable, efficient, and cost effective manner.

SUMMARY OF THE INVENTION

Embodiments of the invention generally provide a method and apparatus for assembling optical components used in interconnecting optical subassemblies. In one embodiment, the invention provides one or more optical component processing stages for processing optical subassemblies, wherein the stages may include a component installation stage adapted to assemble a plurality of components on a plurality of fiber optic cables, a fiber preparation stage adapted to remove the outer coating of a fiber optic cable to expose a fiber optic cladding and core, and a component attachment stage adapted to attach at least one optical component on the cladding and the core. Additionally, a fiber trim stage adapted to trim an excess of cladding and core material from an optical interface, an optical surface polishing stage adapted to polish an optical interface surface, and at least one movable optical component carrier adapted to transport the plurality of fiber optic cables and the plurality of components between the one or more optical component processing stages may be provided.

In another embodiment, the invention provides a system of processing stages for assembling optical interconnections to a plurality of fiber optic cables, wherein the system includes a process controller adapted to control at least one of the processing stages. The processing stages may include a component installation stage adapted to assemble a plurality of components on the plurality of fiber optic cables, a fiber preparation stage adapted to remove an outer coating of an optical fiber to expose an optical fiber cladding and core, and an component attachment stage adapted to attach at least one optical component on the optical fiber cladding and core. The invention may further include a fiber trim stage adapted to trim a section of the optical fiber cladding and core protruding from the at least one optical component, a polishing stage adapted to polish an optical interface surface, a testing stage adapted to test the at least one optical component, and at least one optical component carrier supported by a carrier transport system adapted to move the at least one optical component carrier between a plurality of the processing stages and between a plurality of processing positions.

In another embodiment, the invention provides a method for assembling optical interconnections using a staged optic component processing system having a plurality of processing stages. The method may include preparing an end of at least one fiber optic cable to accept at least one optical component thereon, then attaching the at least one optical component on the end of the at least one fiber optic cable. The method may further provide polishing an optical interface of the at least one optical component, and then transporting the at least one optical component and the at least one fiber optic cable on an optical component transport system between at least two of plurality of processing stages.

BRIEF DESCRIPTION OF THE DRAWINGS

So that the manner in which the above recited features of the invention are obtained can be understood in detail, a more particular description of the invention, briefly summarized above, may be had by reference to the embodiments thereof, which are illustrated in the appended drawings. It is to be noted, however, that the appended drawings illustrate only typical embodiments of this invention, and are therefore, not to be considered limiting of its scope, for the invention may admit to other equally effective embodiments.

FIGS. 10A, 10B, 10C, 10D, 10E, 10F, 10G, 10H, 10I and 10J illustrate partial sectional views of the operation of the component installation stage of FIG. 5.

FIG. 11 illustrates a perspective view of an exemplary embodiment of a fiber preparation stage of FIG. 1.

FIGS. 27 and 28 illustrate a perspective view and a side view, respectively, of the optic fiber trim stage of FIG. 26.

DETAILED DESCRIPTION OF THE PREFERRED EMBODIMENT

Figure 1:
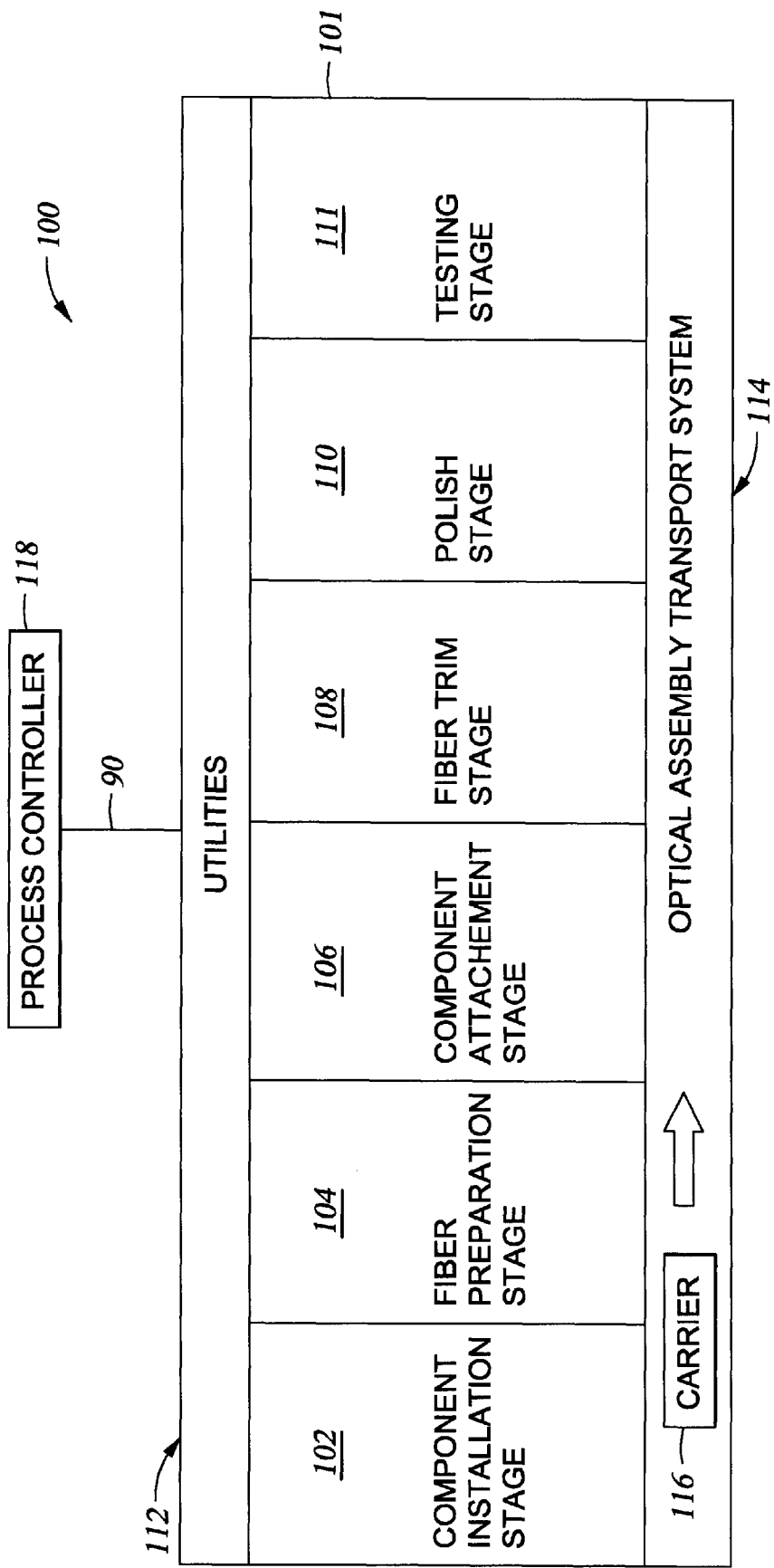
FIG. 1 illustrates an exemplary simplified plan view of one embodiment of a staged optical component processing system of the invention.

Aspects of the invention generally provide a method and apparatus for assembling optical components and optical subassemblies used in interconnecting optical systems. The term optical component herein generally refers to any component, assembly, or subassembly used in the manufacture of optical interconnects and optical subassembly. FIG. 1 is a simplified plan view of one embodiment of a staged optical component processing system 100 of the invention. The staged optical component processing system 100 is a self-contained system having the necessary processing utilities supported on a system frame 101 that can be easily installed, and which provides a quick start up for operation. The optical component processing system 100 includes an optical component installation stage (CI) 102 adapted to install a plurality of optical components, e.g., ferrules, onto a fiber optic cable. The term ferrule is used herein to denote a fiber-optic cable connector as is known in the art. Ferrules generally have three parts: a flange portion usually made of a rigid material, e.g., stainless steel, to allow the ferrule to be mechanically coupled to an optical subassembly; a body; and a fiber optic cable receiving end having a small center opening used to receive a fiber optic cable (i.e., pigtail) and an optical transmission portion to receive the cladding and core of the fiber optic cable. The body is typically made of materials such as zirconia, alumina, and materials similar thereto that may be adapted to support a fiber optic cable. Ferrule connectors are generally available in several different light transmission modes, such as single mode, which is used to transmit one signal per fiber, or multimode, which is used to transmit many signals per fiber, depending on the number of wavelengths contained within the transmission. The optical component processing system 100 also includes an optical fiber preparation stage (FP) 104 adapted to remove an outer protective coating from a fiber optic cable to expose a fiber optic cladding layer surrounding a fiber optic core. The term core is used herein to describe the light transmission portion of a fiber optic cable, which is generally surrounded by the fiber optic cladding. The optical component processing system 100 further includes a component attachment stage (CA) 106, adapted to attach (i.e., terminate) a component, e.g., a ferrule, onto an exposed cladding and core portion of a fiber optic cable. To finish the component attachment and optical interface, the optical component processing system 100 may further include a fiber optic trim stage (FT) 108 adapted to cut and trim a fiber optic cladding and core length protruding from an optical component optical interface. The optical component processing system 100 may also includes an optical component interface polishing stage (POL) 110 configured to polish the optical interface. The optical component interface polishing stage (POL) 110 may include three polishing stages adapted to grind, polish, and finish the optical interface surface of the component in order to provide an exemplar optical interface connection. In one aspect, the optical component processing system 100 further includes an optical component testing stage (TEST) adapted to power (i.e., bias), stimulate, and test optical component subassemblies for proper operation.

The optical component processing system 100 may further include an optical assembly transport system 114 configured to transport an optical component carrier 116 containing a plurality of optical components to be processed between optical component processing stages 102–111. The optical assembly transport system 114 may be adapted to support one or more optical component carriers 116 to allow for an efficient assembly process. For example, one optical component carrier 116 may be stationed adjacent the component installation stage 102 to receive optical components therein, while another optical component carrier 116 may be stationed adjacent the fiber preparation module 104 for fiber optic cable preparation. The optical component processing system 100 may also include a utility module 112, which houses the support utilities needed for operation of the optical component processing system 100, such as compressed air used to power portions of the optical component processing system 100, de-ionized water and/or $CO_2$ used for cleaning, vacuum, and electrical power distribution components.

In one aspect of the invention, the optical component processing system 100 further includes a process controller 118. The process controller 118 is coupled to the optical component processing system 100 via an input/output (I/O) cable 90. In general, the processing system controller 118 may include a controller, such as programmable logic controller (PLC), computer, or other microprocessor-based controller. The process controller 118 may include a central processing unit (CPU) in electrical communication with a memory, wherein the memory may contain an optical component assembly control program that, when executed by the CPU, provides support for controlling the optical component processing system 100. In another aspect of the invention, the processing system controller 118 may provide control signals for the processing of the subassemblies at each processing stage 102–111, movement of the optical component carrier 116 on the optical assembly transport system 114, and optical component testing protocols at the testing stage 111. The processing system controller 118 may also be adapted to receive signals, such as processing status, test data, and the other signals from each of the processing stages 102–111, as well as the optical assembly transport system 114 to provide control of the component processing. The optical component assembly control program may conform to any one of a number of different programming languages. For example, the program code can be written in PLC code (e.g., ladder logic), C, C++, BASIC, Pascal, or a number of other languages.

Optical Component Carrier

Figure 2:
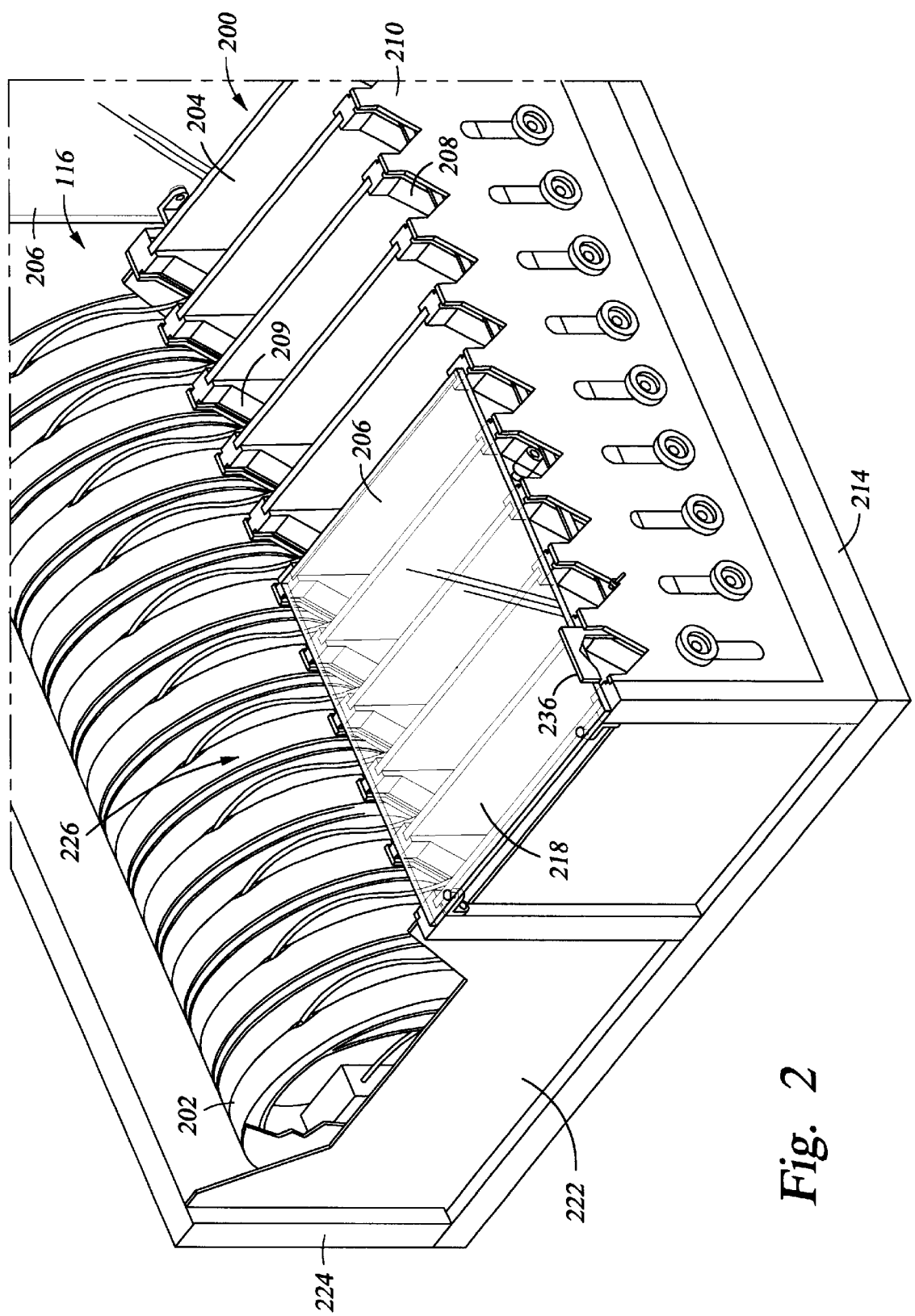
FIG. 2 illustrates a perspective view of an exemplary embodiment of an optical component carrier of the invention.
Figure 3:
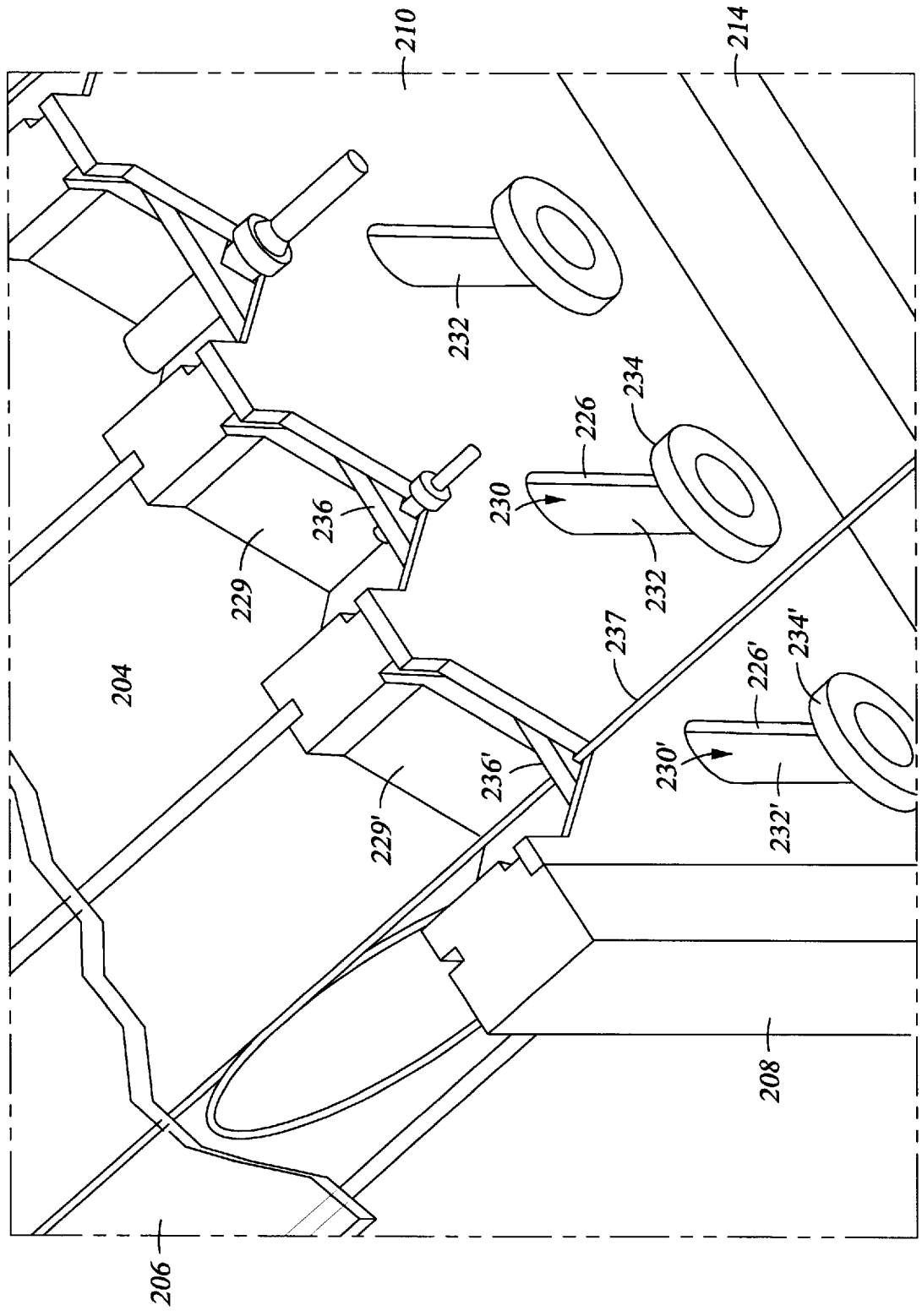
FIG. 3 illustrates a magnified perspective view of the exemplary optical component carrier illustrated in FIG. 2.

FIGS. 2–3 illustrate perspective views of one embodiment of an optical component carrier 116. The optical component carrier 116 is adapted to hold a plurality of fiber optic cables and optical components therein. The optical component carrier 116 includes a top 206 (e.g., a lid), a bottom 214, a back wall 224, a front wall 210, and sidewalls 222 that define a storage region 200 therein. In one aspect, for ease of component loading and unloading, the lid 206 may be removable from, or hinged, to any of the sidewalls 222, the bottom 214, and/or the front wall 210. The optical component carrier 116 includes a front member 208 parallel to and disposed adjacent the front wall 210. The optical component carrier 116 also includes a mid member 209 generally orthogonal to the sidewall 222 and the bottom 214 and disposed between the front wall 210 and back wall 224. The mid member 209, sidewalls 222, and back wall 224, define an assembly holding region 226 configured to hold a plurality of component storage apparatuses 202 therein. The component storage apparatuses 202 may be adapted to hold a fiber optic cable and/or a plurality of components therein. The mid member 209 and front member 208 are separated by a plurality of partitions 218. The partitions 218 are generally parallel and spaced sufficiently from each other to hold a fiber or component therebetween. The partitions 218 are generally parallel to the sidewalls 222, and orthogonal to the front wall 210 and the bottom 214. The front member 208, the partitions 218, and the mid member 209 may be adapted to form individual component assembly slots 204 configured to hold a plurality of optical components and at least one fiber optic cable therein.

FIG. 3 illustrates a magnified perspective view of the front member 208 and front wall 210, which are adapted to form a plurality of v-shaped notches 229, each of which may hold and position a fiber optic cable and/or optical component in a processing position. The front member 208 and front wall 210 are generally spaced apart to allow a clamp apparatus 230 to move freely in a vertical manner therebetween. The clamp apparatus 230 is generally adapted to hold a fiber optic cable or component, e.g., ferrule, within the v-shaped notch 229. The clamp apparatus 230 includes a sliding member 232 that is slidably disposed between the front member 208 and front wall 210. The sliding member 232 includes a clamp member 236 that is adapted, when positioned against a component or fiber optic cable, to force the fiber optic cable or component into the v-shaped notch 229. The clamp apparatus 230 further includes an engaging member 234 coupled to the sliding member 232 to position the clamp member 236 toward or away from a fiber optic cable or component positioned within the v-shaped notch 229. The engaging member 234 is disposed within, and in sliding engagement with a slot 226 of the front wall 210. The slot 226 is adapted to allow a desired vertical travel of the sliding member 232 to release or engage the fiber optic cable or component within the v-shaped slot 229. While normally the weight of the clamp member 236 may be sufficient to supply a component holding force when a component is held between the v-shaped notch 229 and the clamp member 236, in one aspect, the clamp apparatus 230 may be biased, i.e., spring loaded, in order to provide a clamping force to the clamp member 236 to assist in positioning and holding the fiber optic cable or component within the v-shaped notch 229. In operation, a lifting tool or other engaging apparatus may activate the engaging member 234 to slide the sliding member 232 within the slot 226 to hold or release a fiber optic cable or component from the v-shaped notch 229. For example, as illustrated in FIG. 3, an first engaging member 234' is positioned in a lower position in the first slot 226' to position the first sliding member 232' and first clamp member 236' to hold a first fiber optic cable 237 within a first v-shaped notch 229'.

Figure 4:
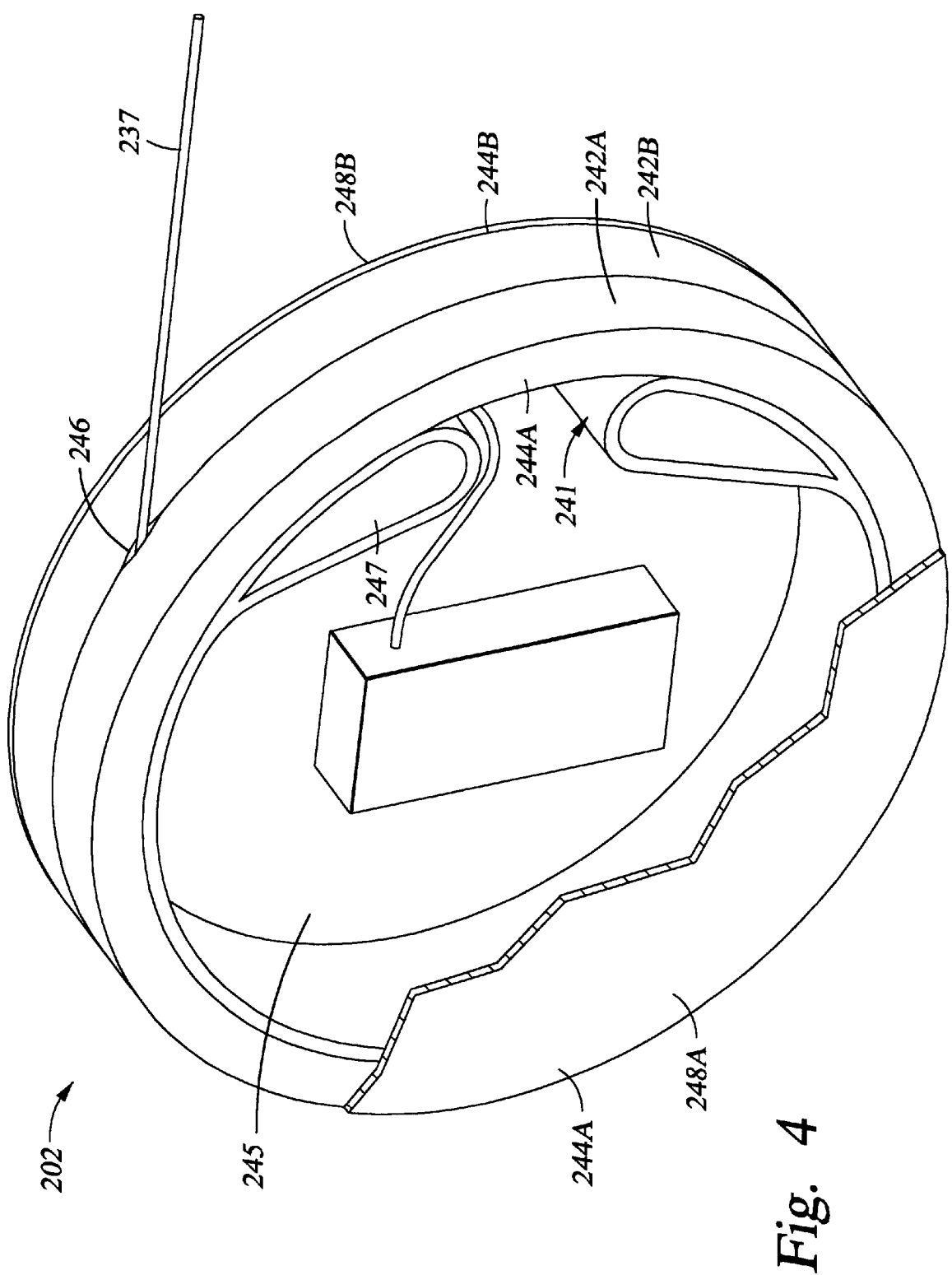
FIG. 4 illustrates a perspective view of an exemplary component storage apparatus of the invention.

FIG. 4 illustrates a perspective view of one embodiment of a component storage apparatus 202. Each component storage apparatus 202 may include a c-shaped spool 247 adapted to support a fiber optic cable 237 thereon, and provide egress and ingress for a fiber optic cable portion therein for processing. The c-shaped spool 247 is generally adapted to dispense the fiber optic cable 237 from a spool opening 241 thereon. The c-shaped spool 247 may be made of a rigid material, such as metal, plastic, or other materials that are sufficiently strong and adapted to provide a suitable resilience for the fiber optic cable 237 wrapped thereon. The component storage apparatus 202 may further include two outer rings 242A–B that include outer walls 244A–B, respectively, to form a first cover 248A and a second cover 248B, respectively. The outer rings 242A–B may be made of any flexible material such as foam, rubber, and the like, adapted to provide resilience when compressed. In one aspect, the covers 248A–B, when placed in axial alignment and abutted, define an inner component void 245 and a fiber-dispensing slot 246 whereby the fiber optic cable 237 internal to the c-shaped spool 247 is clamped frictionally within the fiber-dispensing slot 246. In another aspect, the fiber optic cable 237 may be positioned within the inner void 245 in one or more loops to provide a strain relief as the fiber optic cable 237 is pulled in and out of the spool opening 241.

Component Installation

Figure 5:
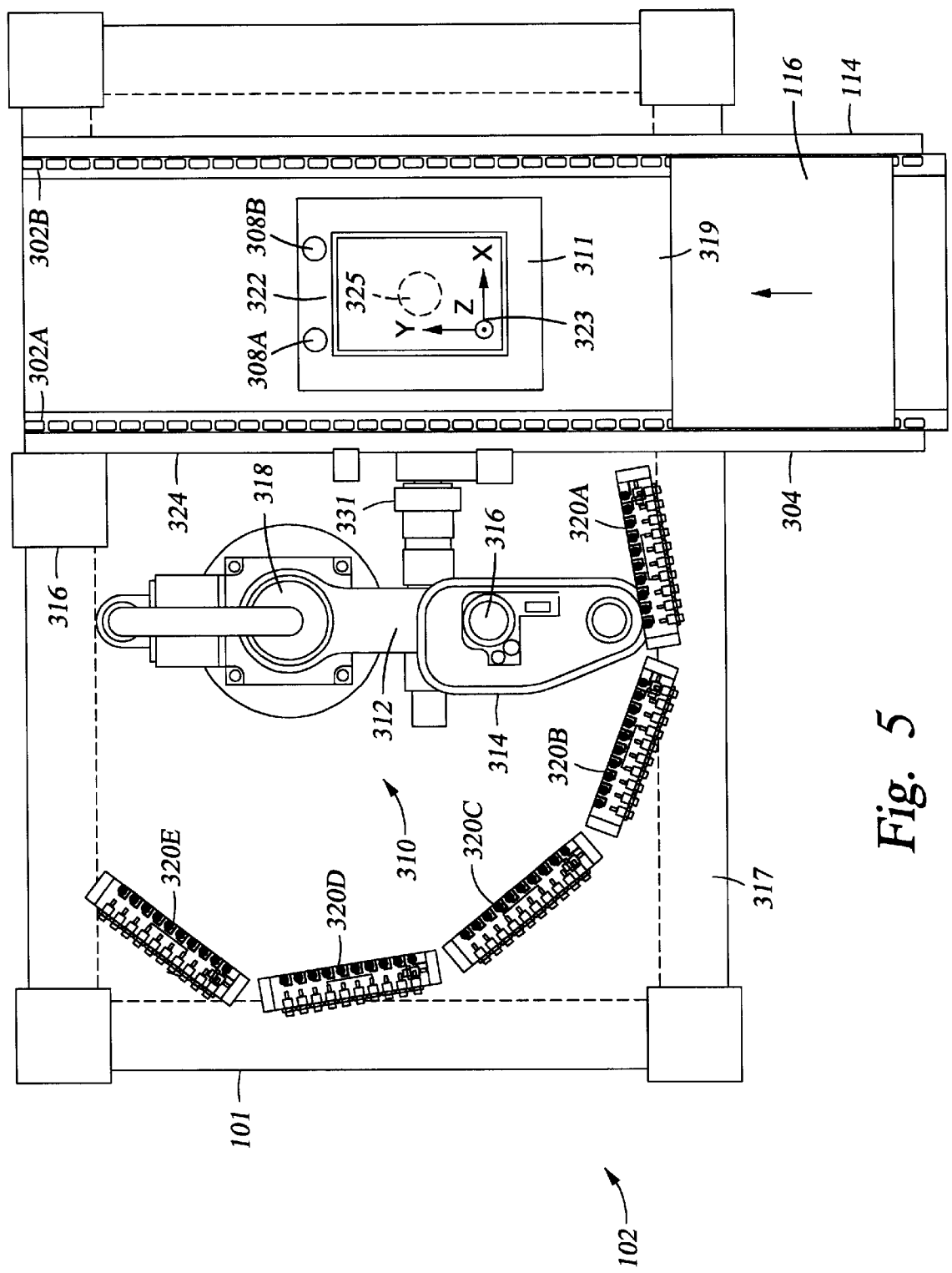
FIG. 5 illustrates a plan view of an exemplary embodiment of an optical component attachment stage and an optical assembly transport system of FIG. 1.
Figure 6:
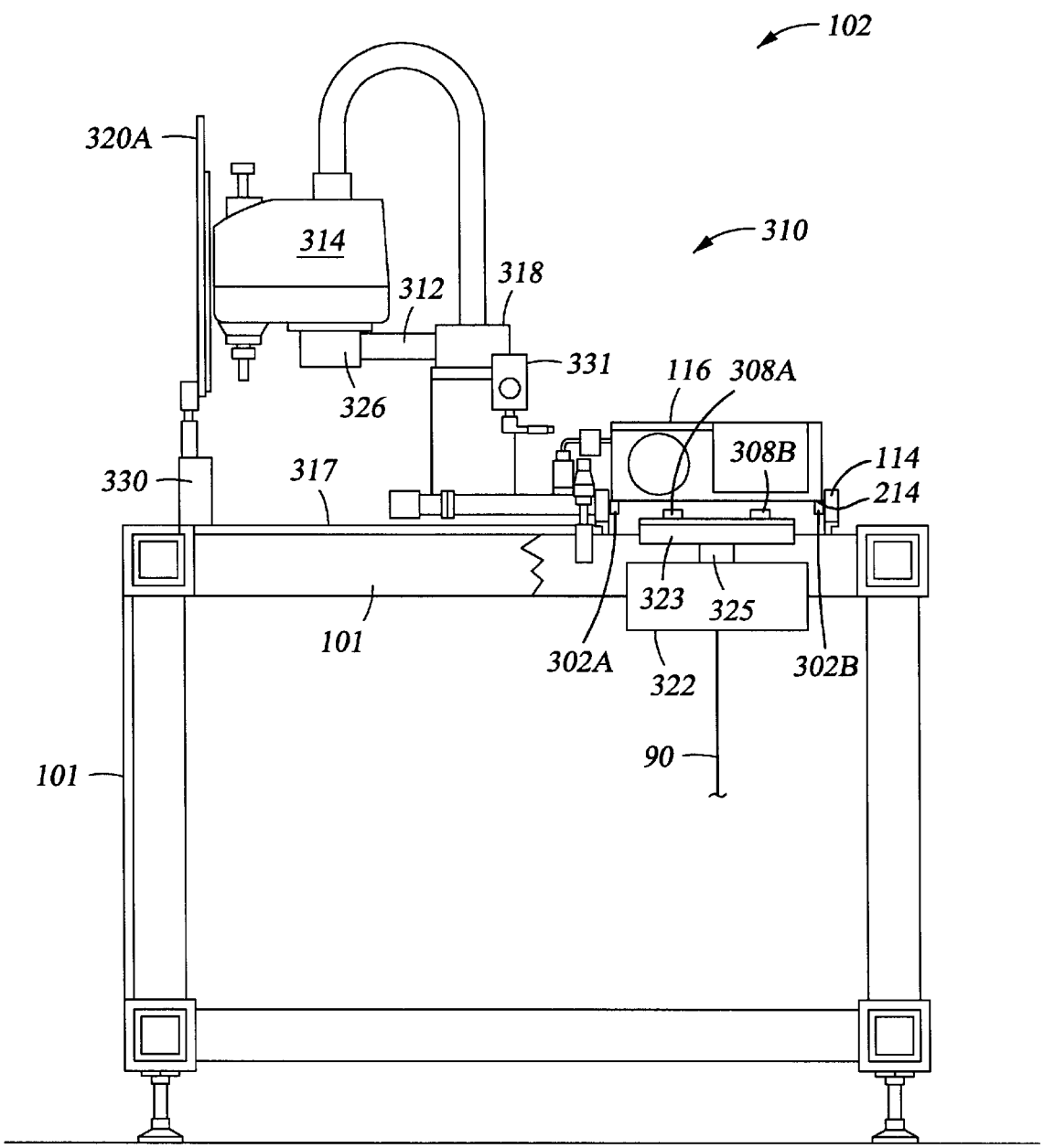
FIG. 6 illustrates a side view of an exemplary embodiment of an optical component attachment assembly of FIG. 5.

FIGS. 5 and 6 are a plan view and a side view respectively of one embodiment of the optical assembly transport system 114 and the component installation stage 102. The optical assembly transport system 114 includes a plurality of rollers 302A–B. The rollers 302A–B are spaced and disposed along the longitudinal axis of the optical assembly transport system 114 to support the optical component carrier 116 and allow for ease of movement of the optical component carrier 116 between the processing stages 102–111. Each of the rollers 302A–B are rotatably mounted to the frame 101 and are generally disposed orthogonal to the travel direction of the optical component carrier 116. In one aspect of the invention, the optical assembly transport system 114 may include a conveyor drive 304 adapted to spin at least one set of the rollers 302A–B to engage the bottom 214 of the optical component carrier 116, and urge the optical component carrier 116 upstream or downstream along a process path defined by the optical assembly transport system 114. In one aspect, as illustrated in FIG. 2, the conveyor drive 304 may include a conveyor motor 316 to drive a roller drive system 324 to rotate the rollers 302A–B. In another aspect, the optical assembly transport system 114 includes a carrier positioning apparatus 322 adapted to receive and position the optical component carrier 116 for processing. The carrier positioning apparatus 322 includes a shaft 325 coupled to a pedestal 323 adapted to support the optical component carrier 116. The pedestal 323 and shaft 325 extend through an opening 311 of the floor 319 of the optical assembly transport system 114 to engage the bottom 214 of the optical component carrier 116. The carrier positioning apparatus 322 may be adapted to move the shaft 325 and pedestal 323 generally in three dimensions, i.e., parallel, vertical, and orthogonal, with respect to the longitudinal axis of the optical assembly transport system 114, i.e., along the axis of rollers 302. In another aspect, the carrier positioning apparatus 322 may be coupled to the I/O cable 90 and responsive to the process controller 118 to position the optical component carrier 116 into a plurality of processing positions.

In operation, the optical component carrier 116 may be moved on the rollers 302A–B upstream or downstream along the optical assembly transport system 114. When the optical component carrier 116 is disposed about adjacent the position apparatus 322 the optical component carrier 116 may be stopped by at least two stop pins 308A and 308B. The carrier positioning apparatus 322 may raise the pedestal 323 upward to contact the bottom 214 of the optical component carrier 116 and then lift the optical component carrier 116 off the rollers 302A–B to stop the optical component carrier 116 from moving to the next processing stage 102–111 and to position the optical component carrier 116 in a plurality of processing positions with respect to the component installation stage 102. Subsequently, the carrier positioning apparatus 322 may move the pedestal 323 and optical component carrier 116 to a desired processing position with respect to the component installation stage 102.

As illustrated in FIGS. 2–3, the component installation stage 102 may be mounted to the system frame 101 adjacent the optical assembly transport system 114 and may be adapted to insert components on fiber optic cables disposed within the optical component carrier 116. The component installation stage 102 generally includes a robot 310 adapted to retrieve and place components on a plurality of fiber optic cables disposed within the optical component carrier 116. A plurality of dispensing tube assemblies 320A–E (five are shown) are disposed on a table top 317 attached to frame 101, and are adapted to hold optical components and assembly components, such as retainers, springs, and other components, to be dispensed. The robot 310 is positioned at about the center of the component installation stage 102 and is adapted to retrieve the components from the dispensing tube assemblies 320A–E, and place the components on a fiber optic cable disposed within the carrier 116. In one aspect, the robot 310 includes a first arm 312 coupled at one end to an axial member 318 and a second end to a second arm 314 via a joint 316. The robot 310 includes a component transfer tool 331 rotatably mounted to a distal end of the second arm 314. The robot 310 and component transfer tool 331 are adapted to transport components from the dispensing tube assemblies 320A–E to the optical component carrier 116, and then install the components on one or more of the fiber optic cables therein. Once the components have been installed on the one or more of fiber optic cables, the optical component carrier 116 may be lowered by the carrier positioning apparatus 322 onto rollers 302A–B, which, in response to the conveyor drive 304 and rollers 302A–B (when activated), transports the optical component carrier 116 upstream or downstream to another processing stage 102–111.

Figure 7:
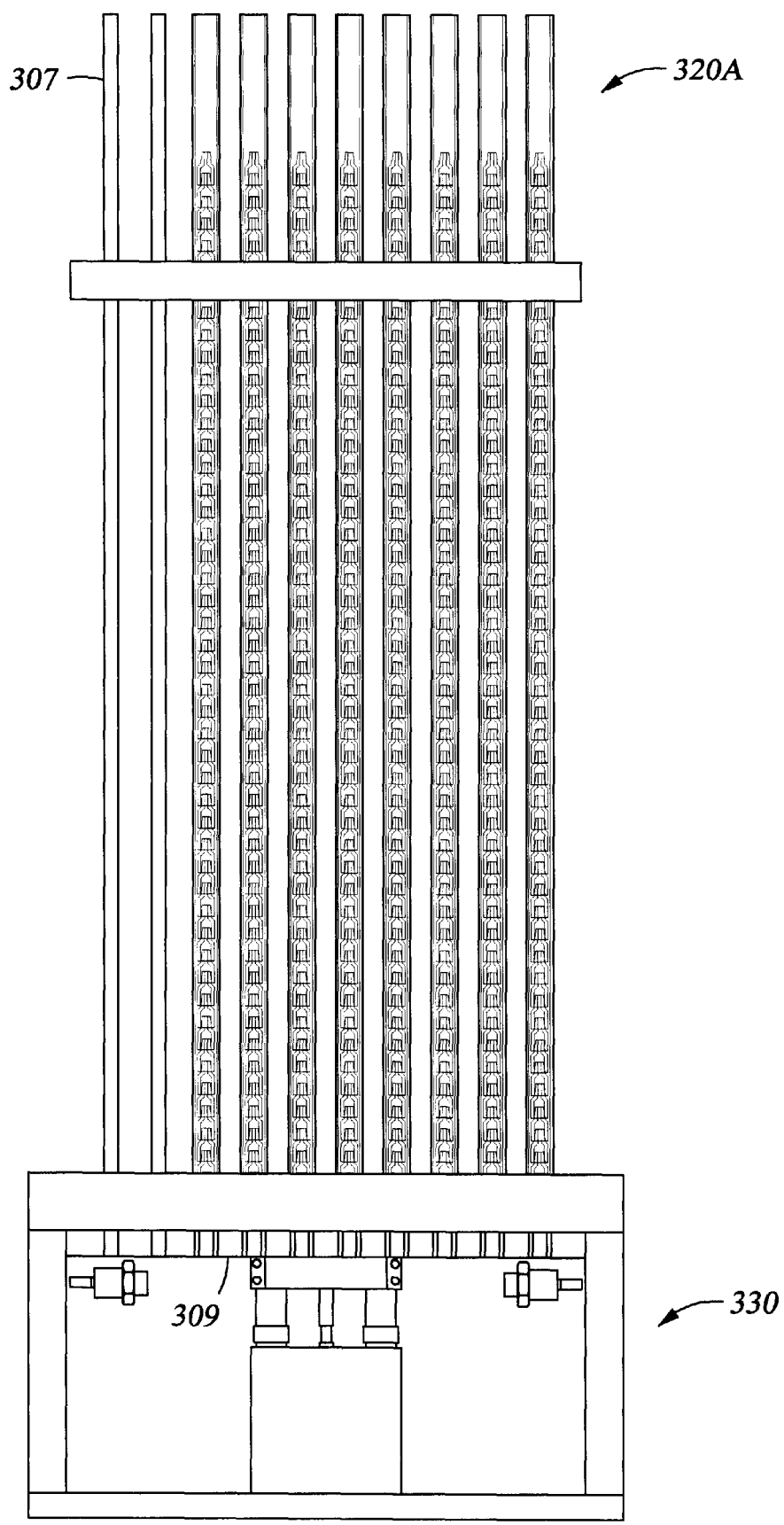
FIG. 7 illustrates a front view of an exemplary embodiment of the component dispensing tube of FIG. 5.

FIG. 7 illustrates one embodiment of a component dispensing tube assembly 320A. The component dispensing tube assembly 320A includes a plurality of component tubes 307. Each component tube 307 generally contains a plurality of vertically stacked components or subassemblies of the same type. For example, the component tubes 307 may contain stacked o-rings. While, the component tubes 307 are generally vertically aligned to facilitate the dispensing of the components through a dispensing orifice 309 using gravity, other alignments are contemplated. Alternatively, the component tubes may be placed configured to be spring biased in order to dispense components. The component tubes 307 are mounted to a component feeder assembly 330 adapted to facilitate the dispensing of components from the dispensing tubes 307.

Figure 9:
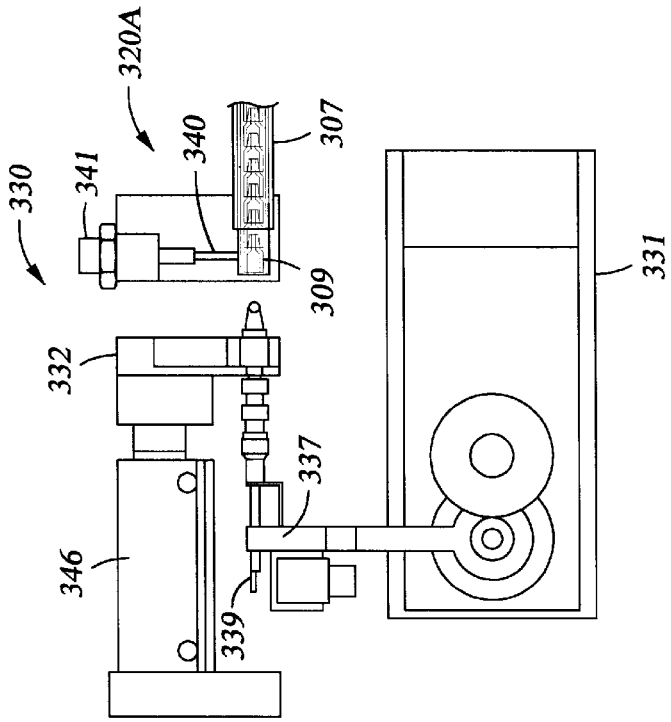
FIG. 9 illustrates a side view of an exemplary embodiment of component feeder assembly, and a sectional view of the lower end of the component dispensing tube assembly of FIG. 5.
Figure 8A:
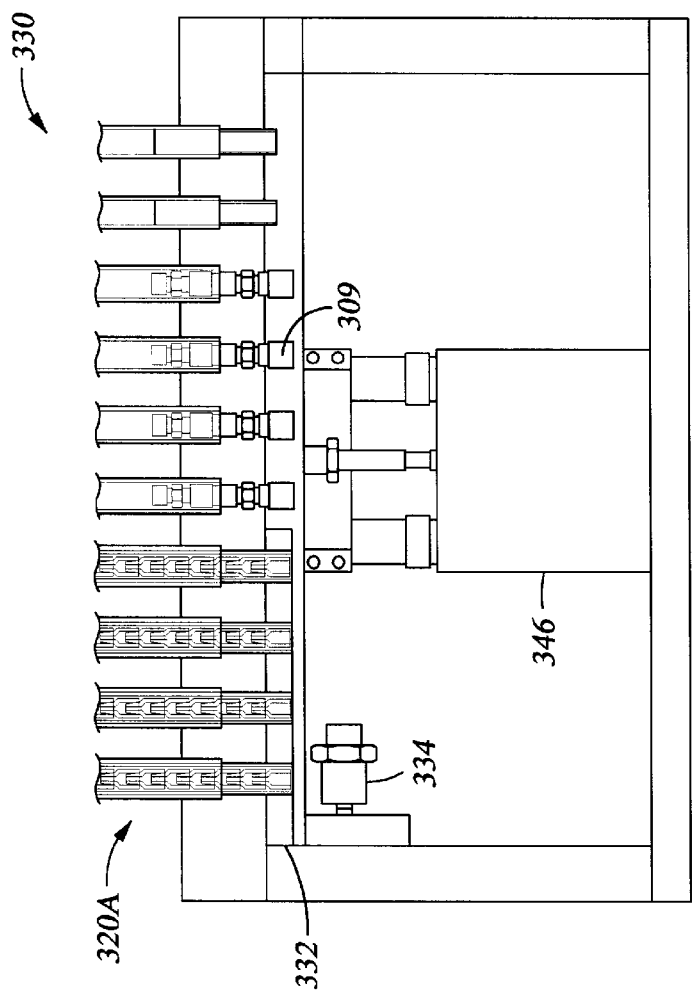
FIGS. 8A and 8B illustrate top and side views of an exemplary embodiment of a component feeder assembly of FIG. 5.
Figure 8B:
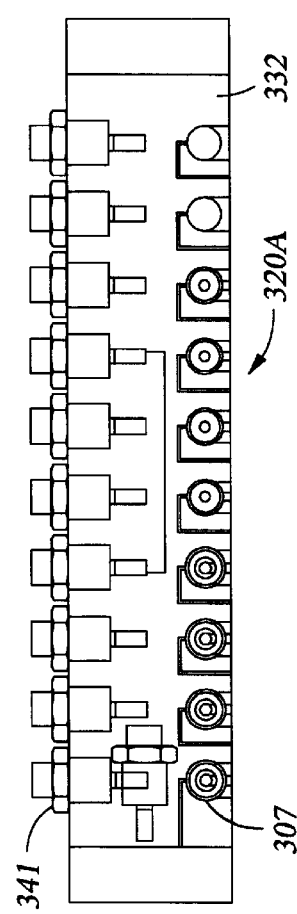

FIGS. 8A and 8B are side and top views, respectively, of one embodiment of a component feeder assembly 330. The component feeder assembly 330 generally includes a nest plate 332 adapted to support the dispensing tube assemblies 320A–E, and component tubes 307. The component feeder assembly 330 may include a separator air actuator 334 adapted to move the nest plate 332 in a generally horizontal plane, and a pneumatic thruster 346 adapted to raise and lower the nest plate 332 to facilitate component dispensing. FIG. 9 is a side view of the nest plate 332, the component transfer tool 331, including a component holding arm 337 and a sectional view of a lower end of the component dispensing tube assembly 320A. FIG. 9 illustrates the pneumatic thruster 346 in a lowered position relative to the component dispensing tube assembly 320A and the component transfer tool 331 in a component holding position. The component transfer tool 331 includes on a distal end of the component holding arm 337, a component holding shaft 339 adapted to hold a plurality of components stacked in an axial position thereon. Illustratively, a plurality of components are shown stacked on the component holding shaft 339. In one aspect, the component transfer tool 331 may rotate the component holding shaft 339 between about a vertical component loading position and about a horizontal component dispensing position in about axial alignment with the longitudinal axis of the fiber optic cable to dispense components thereon. A dispensing tool 340 is disposed adjacent and in sliding engagement with the component feeder assembly 330. The dispensing tool 340 is used to regulate the dispensing of the components through the dispensing orifice 309 and is actuated by a dispensing actuator 341.

FIGS. 10A through 10J are partial sectional views illustrating the operation of the nest plate 332, and component feeder assembly 330, dispensing components from the component tubes 307 onto the component holding shaft 339. FIG. 10A illustrates a partial view of the component feeder assembly 330 in component acquisition position where the dispensing tool 340 and a separator 355 are shown in a retracted position relative a component 351 A. To receive components therein, the nest plate 332 is disposed adjacent the dispensing orifice 309. FIG. 10B illustrates a component groove 354 of the nest plate 332 having the component 351A dispensed therein. FIG. 10C illustrates the separator 355 in a component separating position overlaying the component 351A. FIG. 10D illustrates the dispensing tool 340 in a component holding position adjacent the next component 351 B to hold the next component within the component tubes 307. FIG. 10E illustrates the nest plate 332 in a lowered position. FIG. 10F illustrates the holding shaft 339 extending through the nest plate 332 into an axial opening of the component 351A, to slide the component 351A thereon. FIG. 10G illustrates the separator 355 in a open position to allow removal of the component 351A from the component groove 354. FIG. 10H illustrates an empty nest plate 332 after the component has been removed by the component transfer tool 331. In one aspect, the component 351 A is removed by the rotation of the component transfer tool 331 in a horizontal plane generally parallel the component groove 354. FIG. 10I illustrates the nest plate 332 raised to a component loading position adjacent the dispensing orifice 309. FIG. 10J illustrates the dispensing tool 340 and separator 355 in a retracted position to allow the loading of next component 351 B into the component groove 354.

Fiber Preparation

Figure 12:
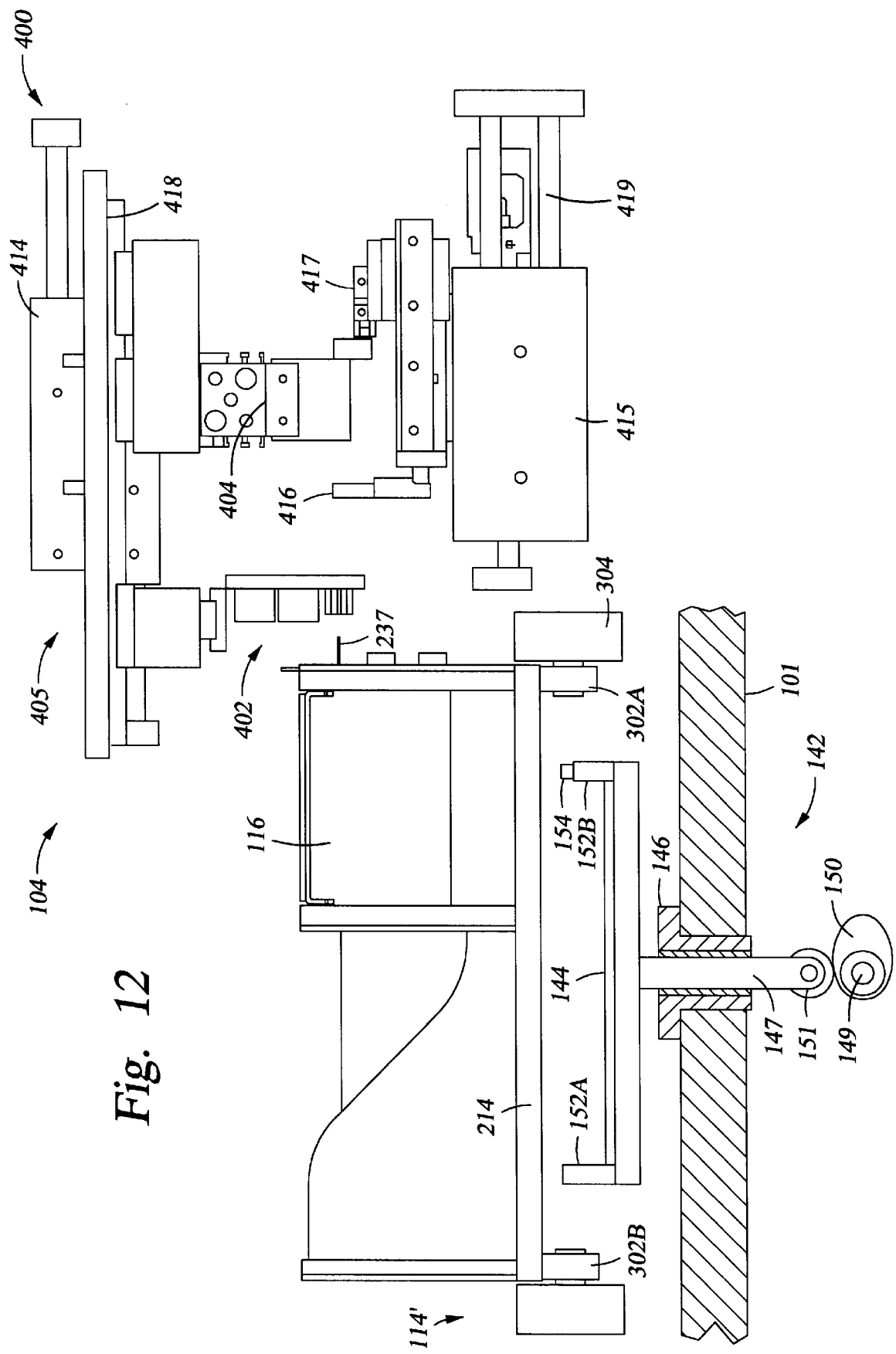
FIG. 12 illustrates a side view of the exemplary fiber preparation stage of FIG. 11.

FIGS. 11–12 are a perspective view and side view, respectively, of one embodiment of a fiber preparation stage 104 of FIG. 1. FIGS. 11–12 illustrate the optical component carrier 116 in a pre-processing position. The fiber preparation stage 104 is disposed adjacent the optical assembly transport system 114 to receive a carrier 116 in a processing position. The fiber preparation stage 104 includes a fiber preparation tool 400. The fiber preparation tool 400 includes fiber strip/cut assembly 405, which includes an upper positioning member 414. The upper positioning member 414 includes a cutting tool 402 adapted to cut a fiber optic cable 237 and a stripping tool 404 adapted to strip the outer protective coating of the fiber optic cable 237 to expose the fiber optic cladding and core. The upper positioning member 414 further includes an upper positioning motor 418 adapted to move the cutting tool 402 to and from a cutting operation and the stripping tool 404 to and from a stripping operation. In one aspect, the upper positioning member 414 and upper positioning motor 418 may be controlled by the process controller 118 to position the cutting tool 402 and/or stripping tool 404 into a plurality of processing positions. The fiber preparation tool 400 further includes a lower positioning member 415 that includes a first gripper 416, and a second gripper 417. The first and second grippers 416,417 are adapted to hold the fiber optic cable 237 during a striping process or cutting processing step. The lower positioning member 415 includes a lower positioning motor 419 adapted to move the first and second grippers 416,417 between a plurality of processing positions. In one aspect, the lower positioning member 415 may be controlled by the process controller 118 to position the first gripper 416 and/or second gripper 417 into their respective processing positions.

In one embodiment, as illustrated in FIGS. 11–12, the optical assembly transport system 114 is configured as an indexing transport system 114'. The indexing transport system 114' includes a carrier support member 144 adapted to lift and hold an optical component carrier 116 between a component transport position and a component processing position. As illustrated in FIG. 12, the indexing transport system 114' may also include a lifting apparatus 142 having a shaft member 147 in sliding engagement with the frame 101 via bearings 146. The shaft member 147 includes a rolling end 151 distal a support end coupled to the carrier support member 144. The rolling end 151 is in rotatable contact with a cam member 150 disposed on a camshaft 149. When rotated by a camshaft motor (not shown) the cam member 150 is adapted to raise and lower the shaft member 147 in a vertical direction from a lower cam position to an upper cam position, to urge the carrier support 144 into contact with the optical component carrier 116. In one aspect, as illustrated in FIG. 11, the indexing transport system 114' includes indexing stops 147A–C, adapted to index the optical component carrier 116 sequentially between a plurality processing positions with respect to the slots 204 therein. For example, if the optical component carrier includes ten slots 204, the indexing stops 147A–C may be adapted to sequentially position the optical component carrier 116 to ten processing positions corresponding to each slot 204. In operation, the indexing transport system 114' receives one of a plurality of optical component carriers 116 moving along the rollers 320A–B into a processing position relative the fiber preparation stage 104. A first stop 147B is raised vertically to contact recesses (not shown) in the bottom 214 of the optical component carrier 116, while the other two stops 147A and 147C are held in a lower release position. The first stop 147B contacts the optical component carrier 116, stopping the optical component carrier 116 in a first processing position. Subsequently, the camshaft 149 rotates to move the cam member 150 from a lower transport position to a raised processing position. In the raised processing position, the carrier support 144 lifts the optical component carrier 116 off the rollers 302A–B, and into a processing position. In one aspect, as illustrated in FIG. 12, the carrier support 144 includes two support rails 152A–B where the support rail 152B includes a plurality of buttons 154 thereon, adapted to support a recessed portion (not shown) of the optical component carrier 116 bottom 214. In another aspect, a bottom gripper tool 153 is used to pull the bottom 214 of the optical component carrier 116 onto the buttons 154 to secure the optical component carrier 116 for processing.

When processing is finished at the first processing position, the carrier support member 144 is lowered into a release position, allowing the rollers 302A–B to contact the bottom 214 of the optical component carrier 116 thereby urging the optical component carrier 116 toward the next slot 204. Subsequently, the first stop pin 247B is lowered to a release position, and the outer two stops 247A, 247C are raised to a contact position with respective recesses (not shown) in the bottom 214 that correspond to the next slot 204 and second processing position. In one aspect, the fist stop 247B, and outer two stops 247A and 247C, alternate during processing to index the optical component carrier 116 along the optical transport system 114 in a sequential fashion. In another aspect of the invention, as illustrated in FIG. 11, the indexing transport system 114' includes an engaging tube 145 and an engaging tool 156 that are adapted to operate the engaging member 234 (see FIG. 3) of the optical component carrier 116. Operational aspects of the fiber preparation tool 400 is described below with respect to FIGS. 13A–13B, and FIGS. 14A–14F.

Figure 13A:
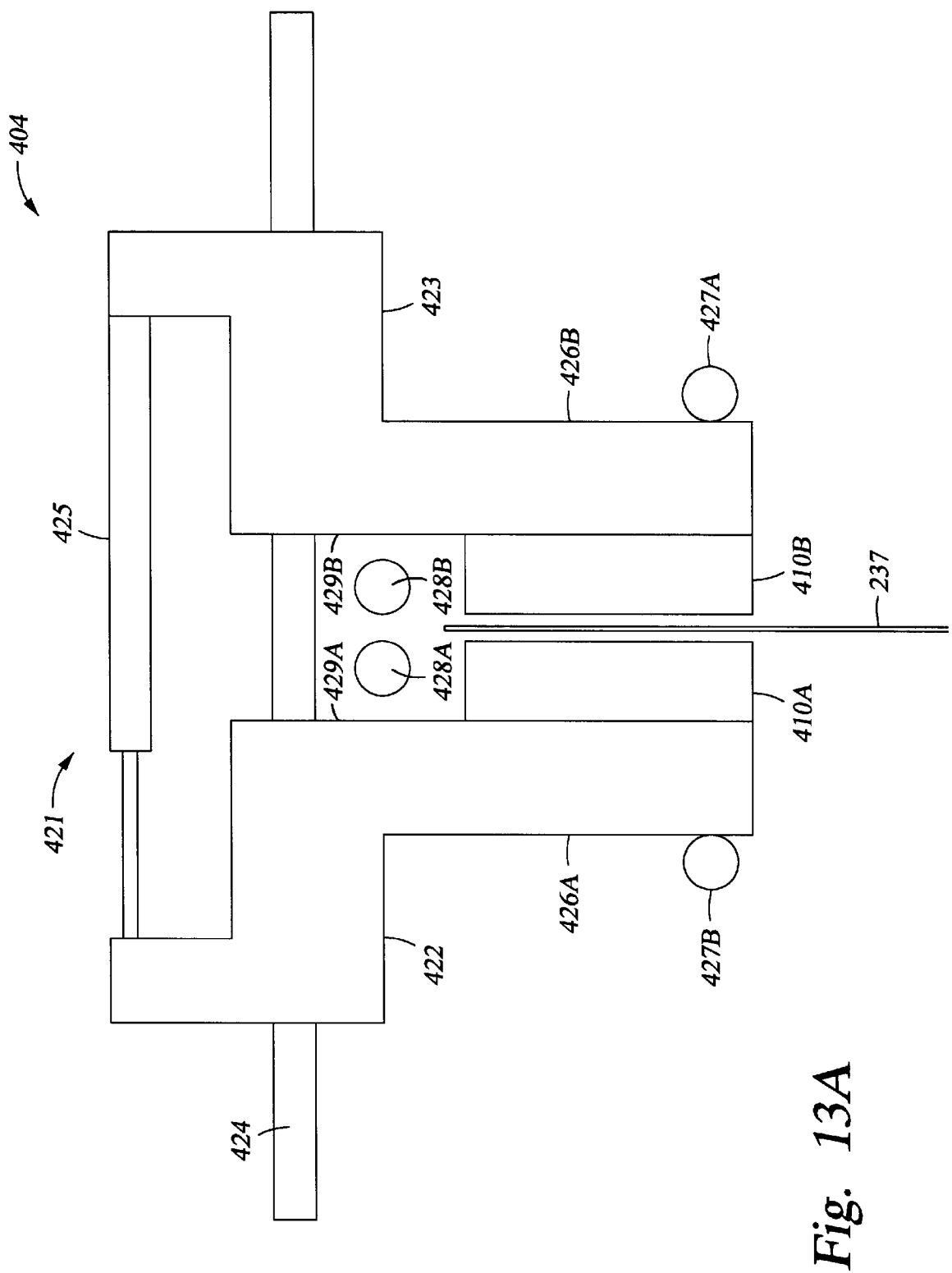
FIGS. 13A and 13B illustrate diagrammatic views of an exemplary embodiment of a stripping tool of FIG. 11.
Figure 13B:
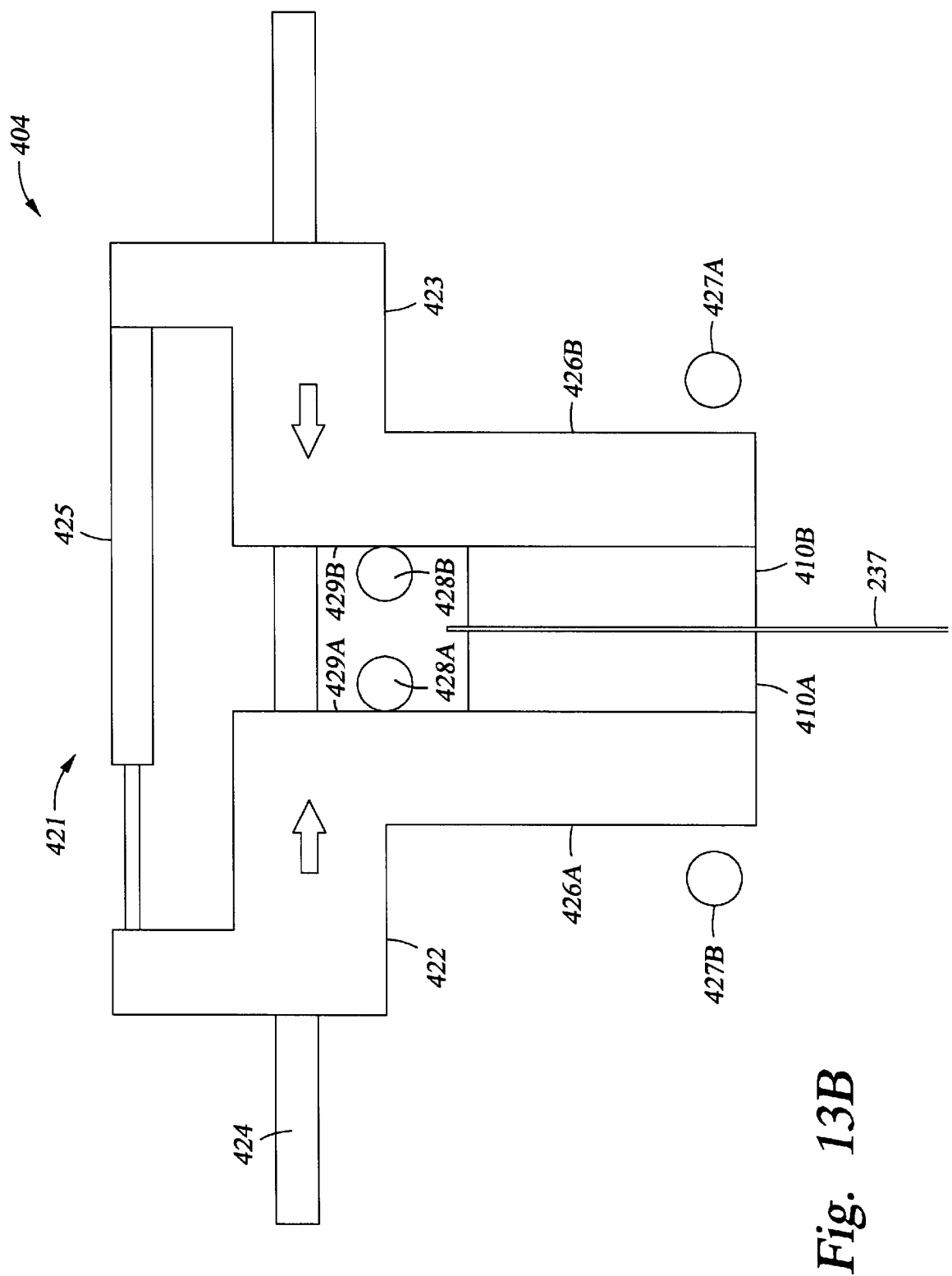

FIGS. 13A and 13B illustrate one embodiment of a fiber stripping tool 404 in different operational positions. The fiber stripping tool 404 includes a body 421 having a first clamping member 422 juxtaposed to a second clamping member 423. The first and second clamping members 422–423 are disposed on, and in slidable engagement with a rail member 424 adapted to allow the first and second clamping members 422–423 to move between a plurality of fiber clamping positions. The first and second clamping members 422–423 are activated by a clamp drive 425 adapted to move the first and second clamp members 422–423 along the rail member 424. The stripping tool 404 further includes a first heating element 410A disposed on the first clamp member 422 and opposite a second heating element 410B disposed on the second clamp member 423. The first and second heating elements 410A–B are positioned to clamp a fiber optic cable 237 therebetween. The heating elements 410A–B may be of any conventional type, such as resistive heaters coupled to a power supply (not shown), that are adapted to heat, melt, and remove the outer protective coating from the fiber optic cable 237 to expose the cladding and core. FIG. 13A illustrates the first and second clamp members in a non-clamping position about a fiber optic cable 237. FIG. 13B illustrates the first and second clamp members 422–423 in a clamping position about the fiber optic cable 237. In one aspect, in order to maintain an even pressure along the clamped portion of the fiber optic cable 237, a first pin 427A and second pin 427B may be disposed along, distal the rail member 424, and in slideable engagement with a respective outer surface 426A–B of the first and second clamp members 422–423. In another aspect, to limit the travel of the clamp members 422–423 toward each other and establish a maximum clamping force, a third pin 428A and a fourth pin 428B may be disposed between and in slideable engagement with a respective inner surface 429A–B of the clamping members 422–423.

Figure 14A:
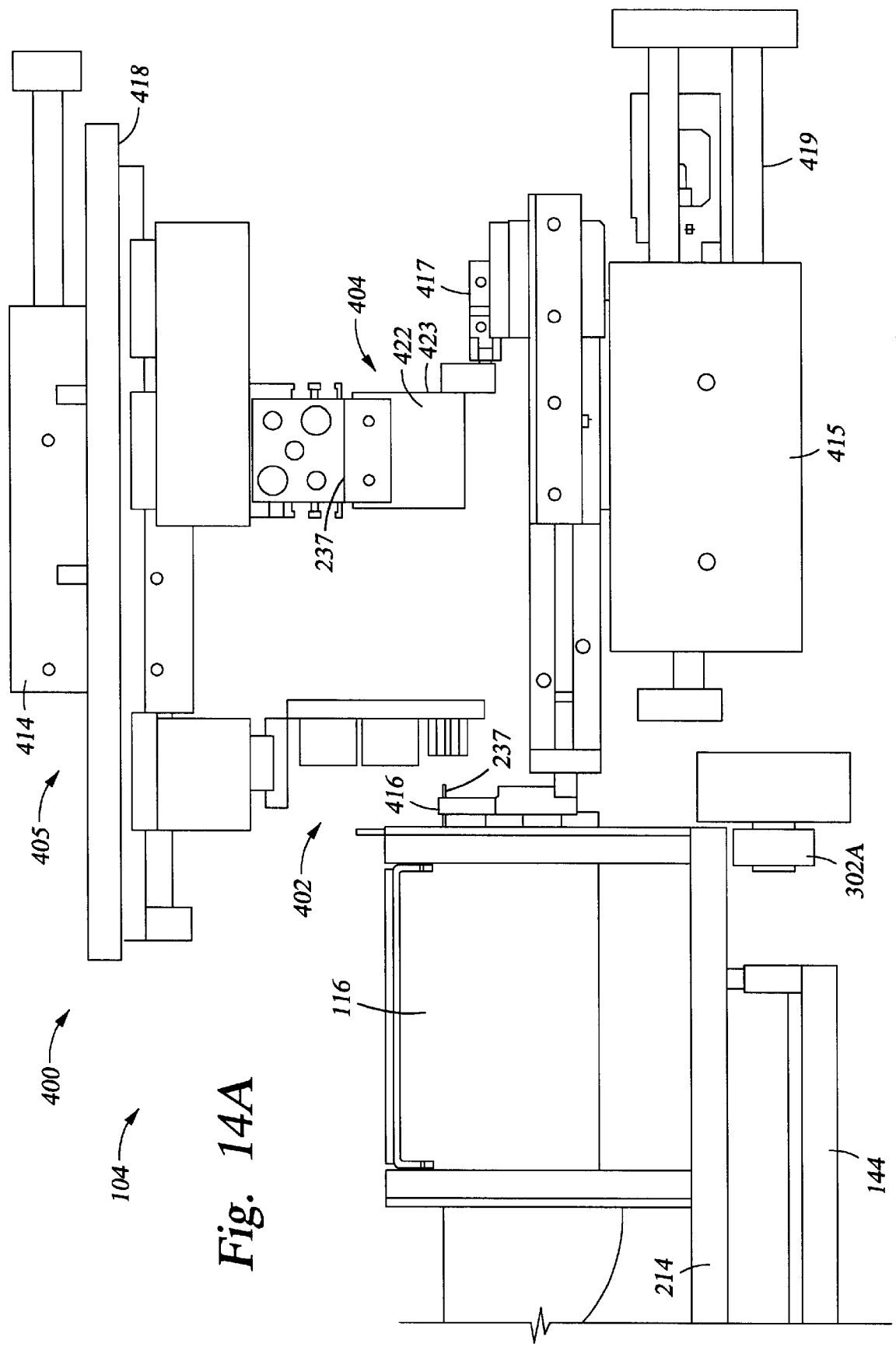
FIGS. 14A, 14B, 14C, 14D, 14E and 14F illustrate diagrammatic views of the operation of the fiber preparation stage of FIG. 11.
Figure 14B:
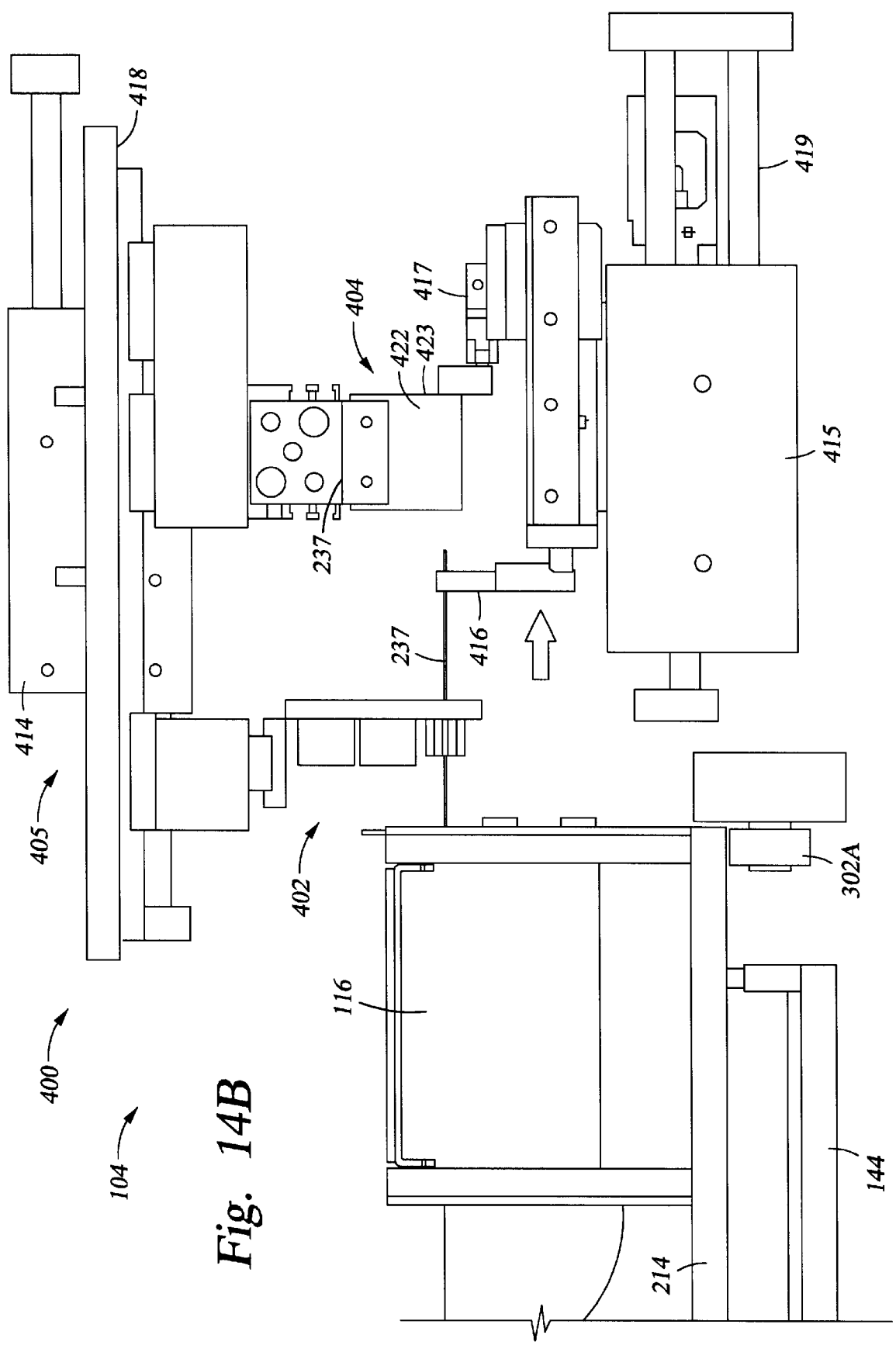
Figure 14C:
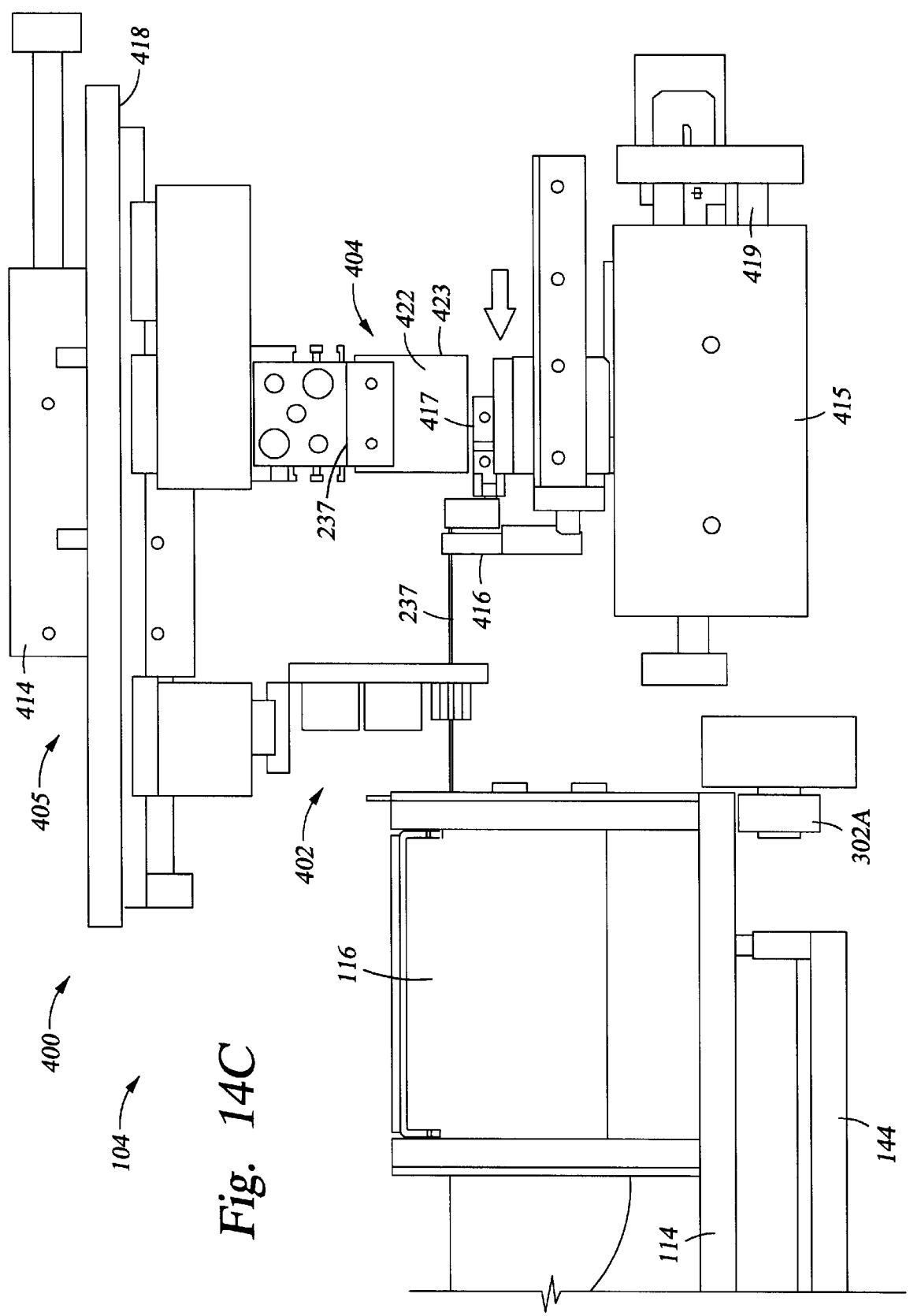
Figure 14D:
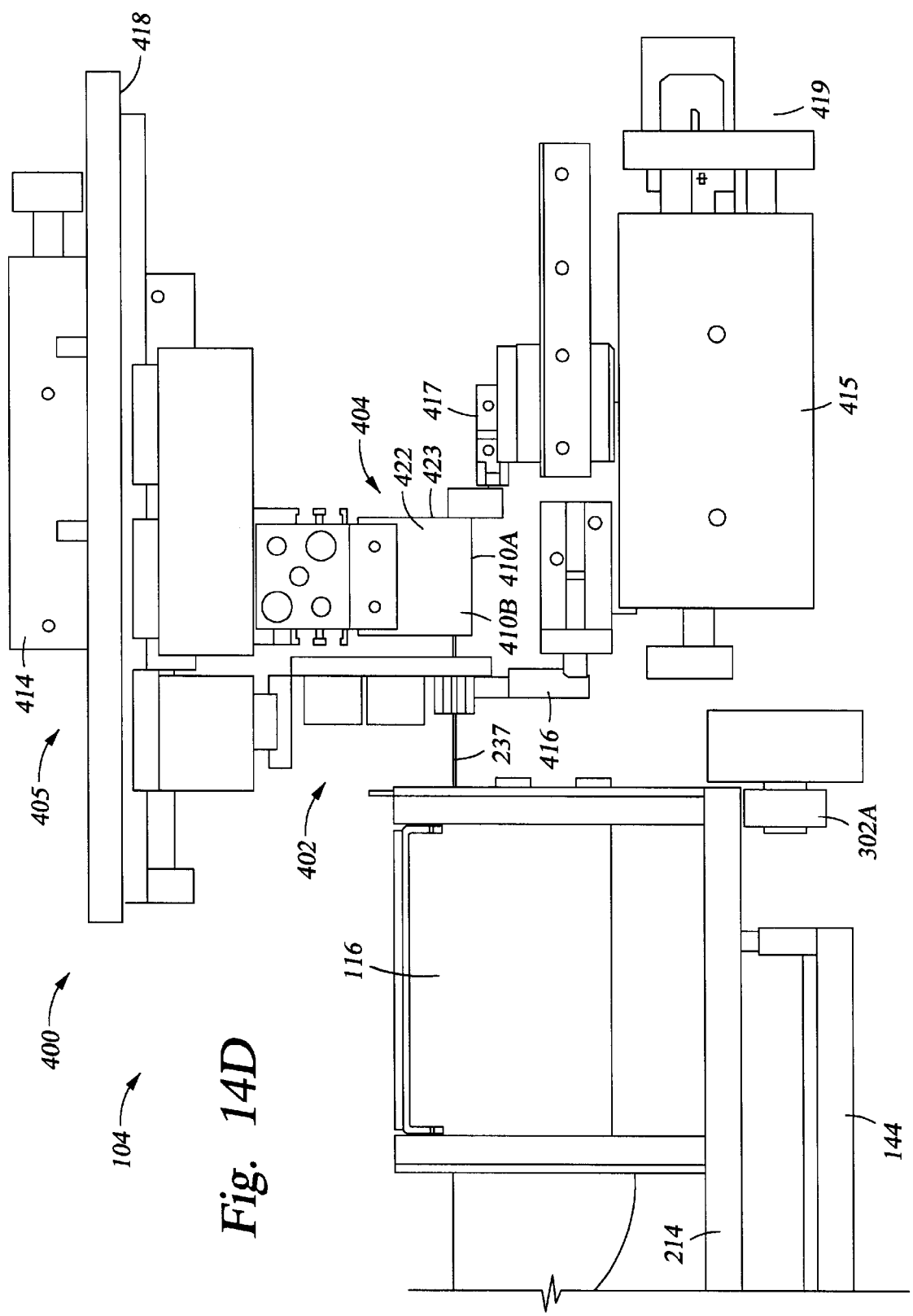
Figure 14E:
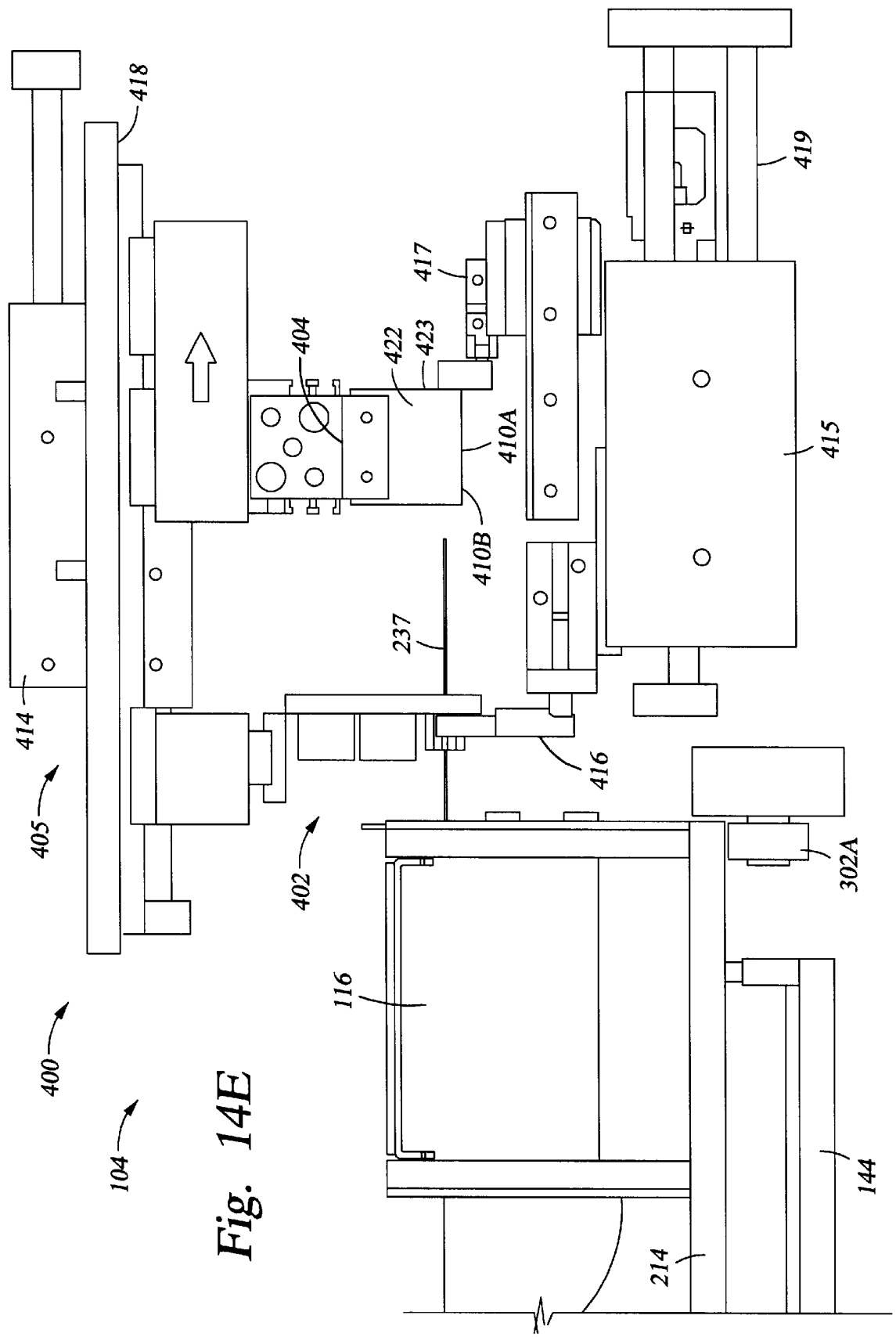
Figure 14F:
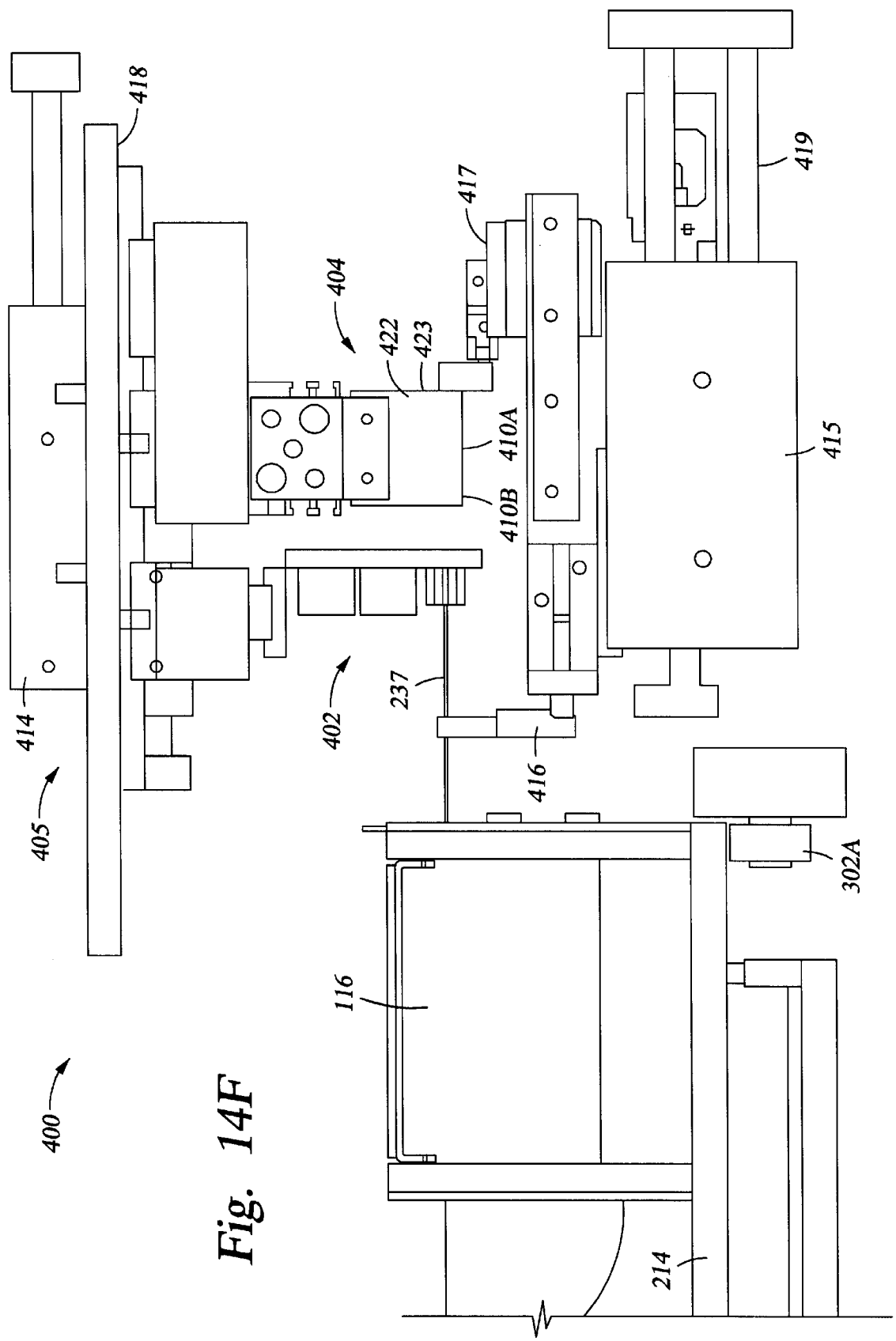

FIGS. 14A through 14F diagrammatic views illustrating one embodiment of a fiber preparation process for the fiber preparation stage 104 of FIGS. 11–12. FIG. 14A illustrates the first gripper 416 in position to pull the end of a fiber optic cable 237 from the optical component carrier 116. The first gripper 416 is positioned adjacent the optical component carrier 116 and a fiber optical cable 237 is illustrated protruding from the optical component carrier 116 and griped by the first gripper 416. FIG. 14B illustrates the first gripper 416 gripping one end of the fiber optic cable 237 and the lower positioning member 415 moving the first gripper 416 about orthogonal away from the optical component carrier 116 to expose a portion of the fiber optic cable 237 for processing. FIG. 14C illustrates the second gripper 417 holding the end of the fiber optic cable 237 to allow the first gripper 416 to reposition along the exposed fiber optic cable 237 toward the carrier 116 to expose a portion of the fiber optic cable 237 for processing therebetween. Subsequently, as illustrated in FIG. 14D, the first gripper 416 moves to a second processing position where it grips the fiber optic cable 237 at a point along the exposed length of the fiber optic cable and the stripping tool 404 positions the first and second clamp members 422–423 about the exposed portion of the fiber optic cable 237. Subsequently, the first and second clamp members 422–423 and heating elements 410A–B are clamped around the fiber optic cable 237. Once the first and second clamp members 422–423 have clamped the fiber optic cable 237, the second gripper 417 moves away to a neutral position. As illustrated in FIG. 14E, once the outer protective coating has been heated sufficiently to melt and be removed, the stripping tool 404 is moved laterally along the fiber optic cable 237 to remove the outer coating of the fiber optic cable 237 exposing the fiber optic core and cladding. Once the outer protective coating has been removed, the cutting tool 402 is positioned adjacent the first gripper 416 and cuts the fiber optic cable core. After cutting, the cutting tool 402 moves to neutral position as illustrated in FIG. 14F. Although in one aspect, a first stripping process removes about 900 microns of fiber coating and a second stripping process removes about 400 micron or about 250 microns of outer protective coating, depending upon the coating thickness, the processes need not be done at the same process step. For example, the a first layer of the outer protective coating may be removed first, the fiber optic core cut by cutting tool 402 and then a second layer may be removed.

Component Attachment

Figure 15:
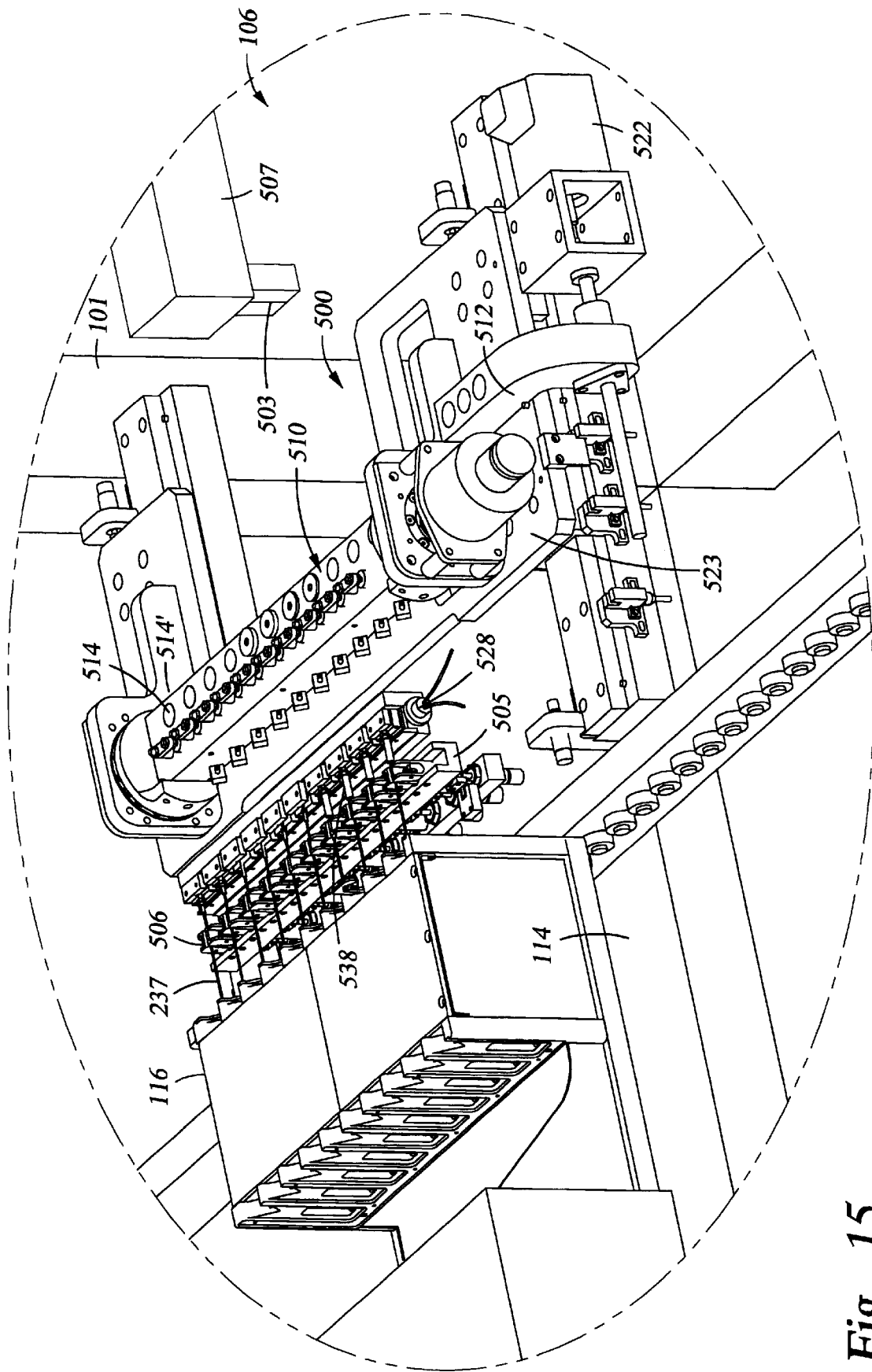
FIG. 15 illustrates a partial perspective view of an exemplary embodiment of a component attachment stage of FIG. 1.

FIG. 15 is partial perspective view of one embodiment of a component attachment stage 106 adjacent the optical assembly transport system 114 wherein a plurality of components 538 have been attached to at least one of a plurality of fiber optic cables 237 extending from an optical component carrier 116. FIGS. 16–25 are a top and side views, respectively, of one embodiment of the component attachment stage 106, illustrating a component attachment sequence. As illustrated in FIG. 15, the component attachment stage 106 may include a component attachment assembly 500 adapted to attach (e.g., terminate) a component 538 onto a fiber optic cable. The component attachment assembly 500 includes a fiber gripper assembly 505 having a plurality of attachment pinchers 506 thereon. As illustrated in FIGS. 16–23, the component attachment assembly 500 may include an attachment robot 507 rotatably mounted to a robot platform 508. The attachment robot 507 may include an attachment gripper 503 thereon adapted to grab and move one or more fiber optic cables from the optical component carrier 116 into a processing position within each attachment pincher 506. As illustrated in FIG. 15, the component attachment assembly 500 may further include a component attachment tool 510 that is adapted to hold one or more components 538, e.g., ferrules, for attachment on the fiber optic cable. The component attachment tool 510 is rotatably mounted to a movable attachment assembly 512 that moves the component attachment tool 510 between a plurality of component loading and a component attachment positions. The moveable attachment assembly 512 may be driven by an attachment motor 522, such as a linear motor or stepper motor. In one aspect, the component attachment tool 510 may be rotated by a rotation motor 523, such as a linear motor or stepper motor, such that a plurality of component holding recesses 514 are positioned in a component loading position to accept components 538 therein. In another aspect, when loaded with components for an attachment process, the component attachment tool 510 may rotate to align a fiber-receiving end of the components 538 in an axial attachment position with respect to a longitudinal axis of the mating fiber optic cable 237.

Figure 16:
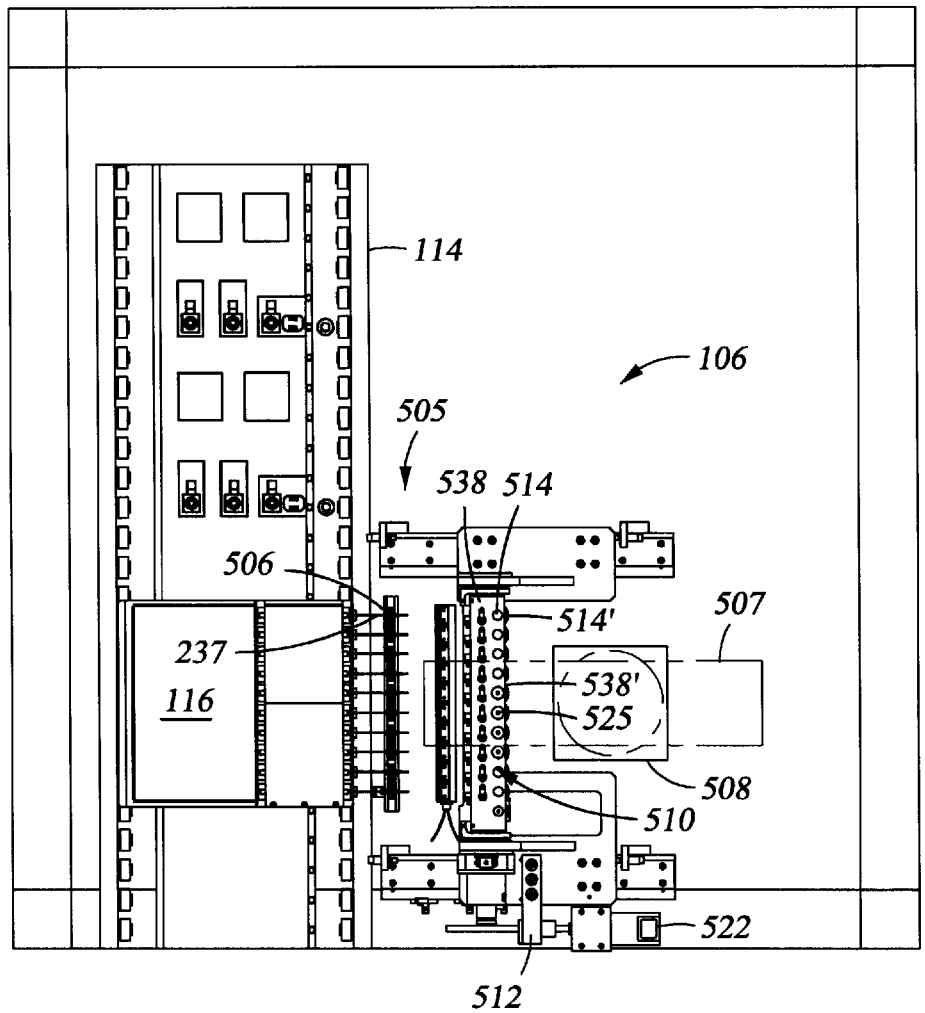
FIGS. 16, 17, 18, 19, 20, 21, 22, 23, 24 and 25 illustrate a top and side views of an exemplary embodiment of the component attachment stage of FIG. 15 during a component attachment sequence.
Figure 17:
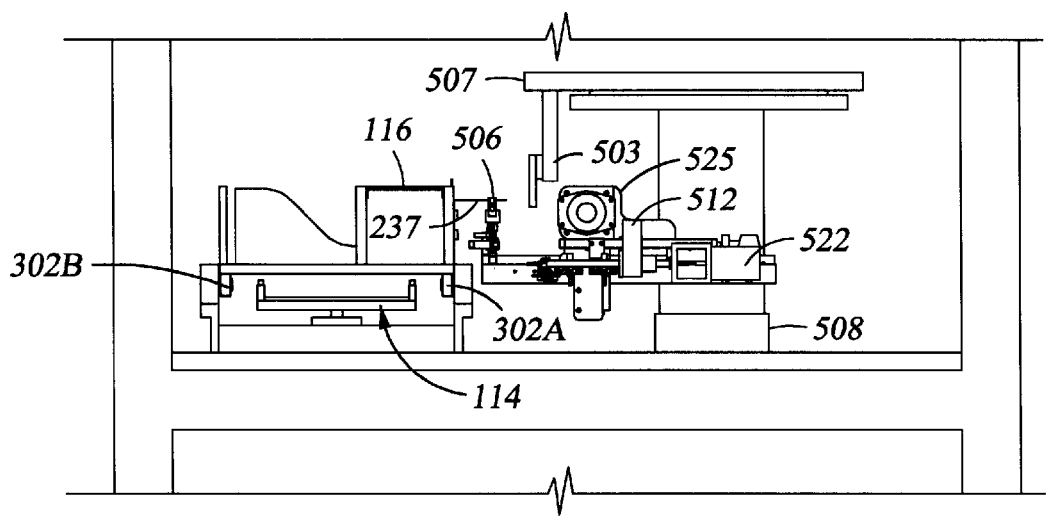
Figure 18:
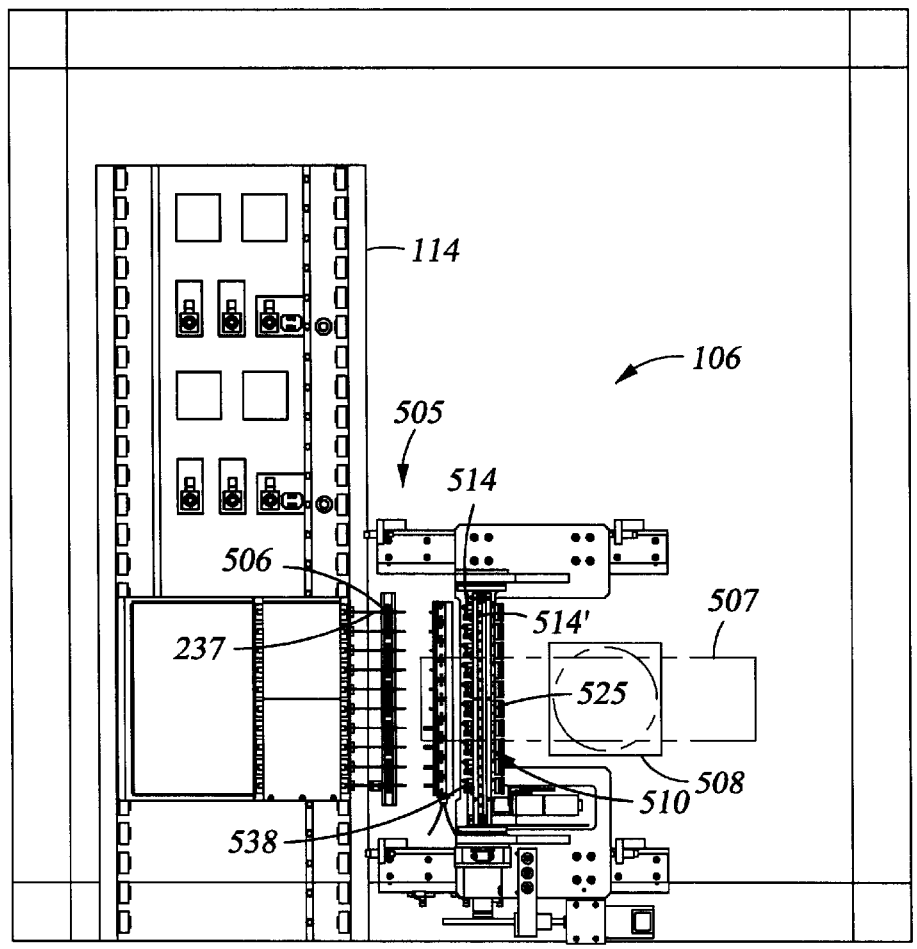
Figure 19:
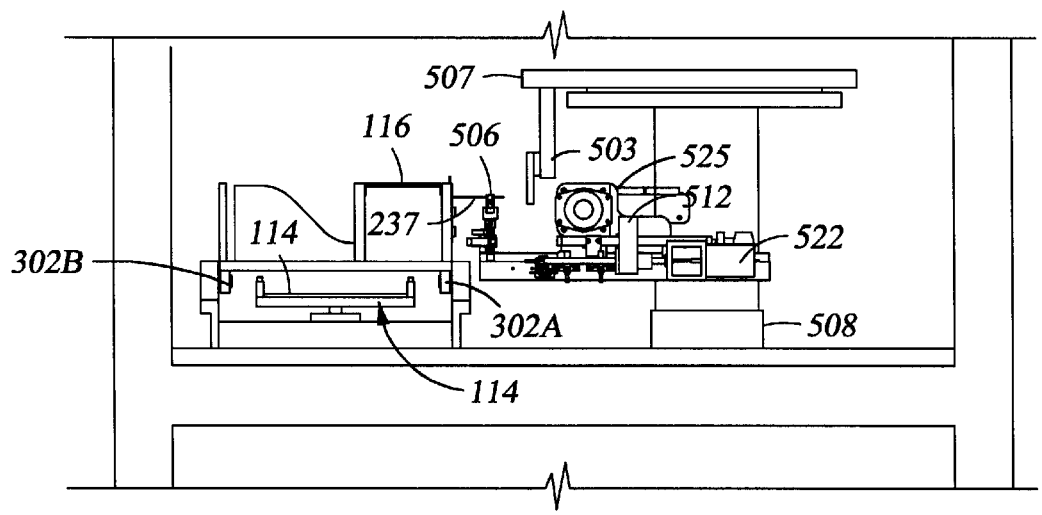

In operation, as illustrated in FIGS. 16–25, the attachment robot 507 moves at least one of a plurality of fiber optic cables 237 from the optical component carrier 116 into an attachment orientation with respect to a fiber-receiving end of a mating optical component 538. Subsequently, the attachment assembly 500 attaches at least one of a plurality of mating optical components 538 on one of the plurality of mating optical fibers 237. For example, as illustrated by FIGS. 16 and 17, optical fibers 237 are positioned by the attachment robot 507 into the fiber gripper assembly 505 within a respective attachment pincher 506 so that a length of the fiber optic cables 237 extend from a respective attachment pincher 506 (ten are shown). In one aspect, the optical fibers 237 are positioned so that an exposed fiber optic cladding and core length extends from the pinchers 506. In another aspect, as components 538 may have different axial insertion (i.e., attachment) depths, therefore, the exposed fiber optic cladding and core length may extend according to the axial insertion depth. Thus, when inserted on the exposed fiber optic cladding and core length, a flange member of the components 538 are generally in axial alignment and may abut a respective pincher 506. FIGS. 18 and 19 illustrate the component attachment tool 510 including a first set of the plurality of components 538 after laterally moving into an attachment position with the fiber optic cable 237. The component attachment tool 510 is rotated to align the individual components 538 into about axial alignment with the exposed core of a mating fiber optic cable 237. In one aspect, the component attachment tool 510 includes a component rotation assembly 525 adapted to individually rotate the components 538 about their longitudinal axis to allow the optical fibers 237 to be more easily inserted.

Figure 20:
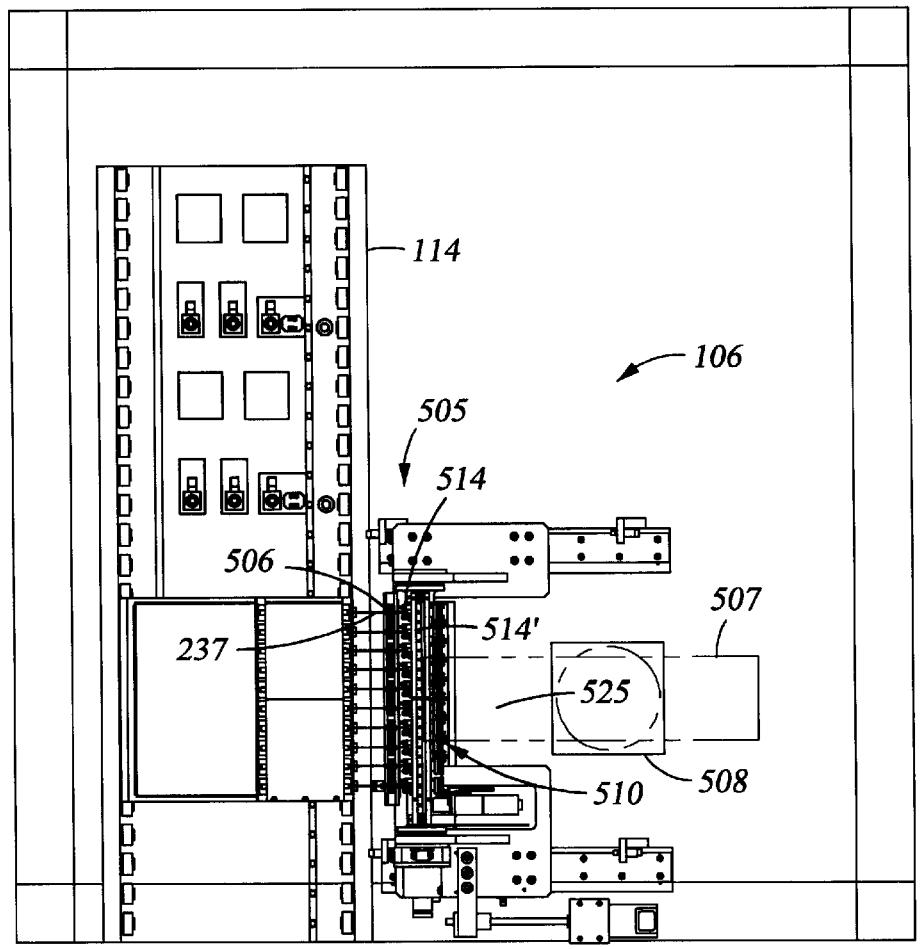
Figure 21:
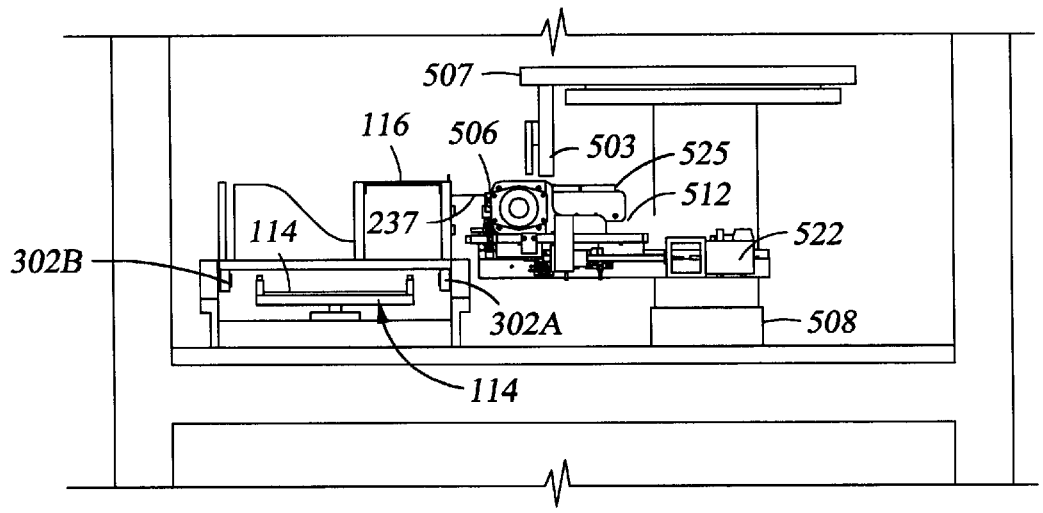
Figure 22:
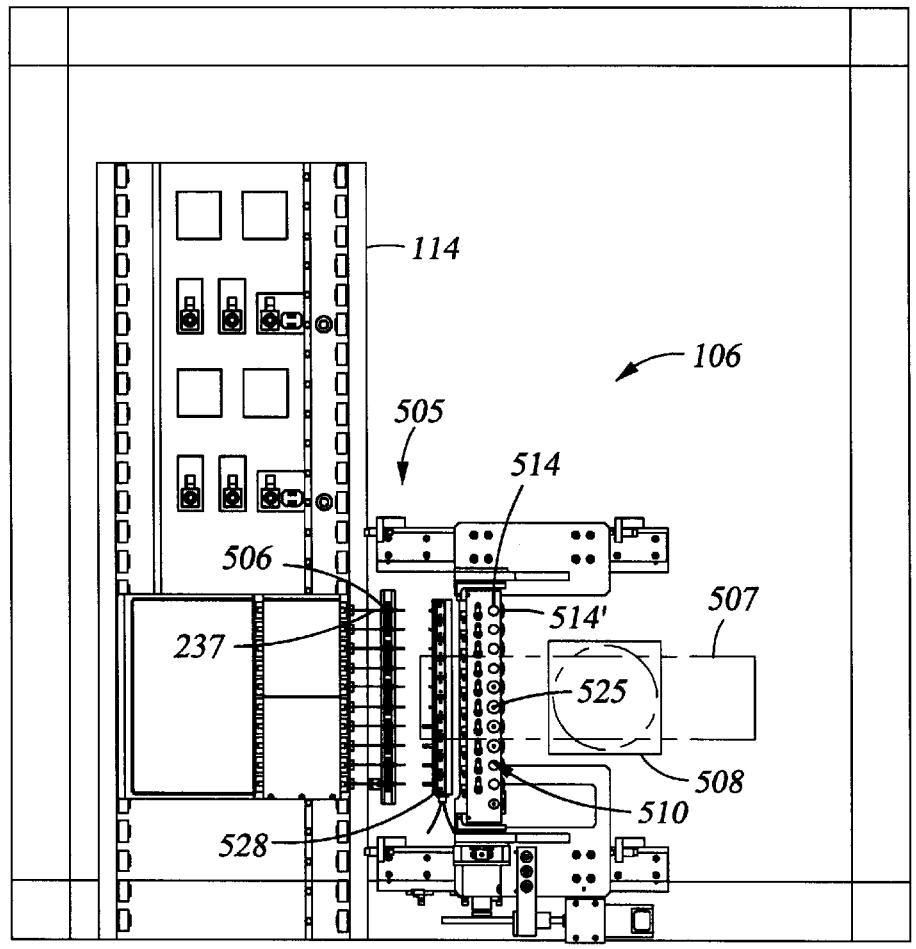
Figure 23:
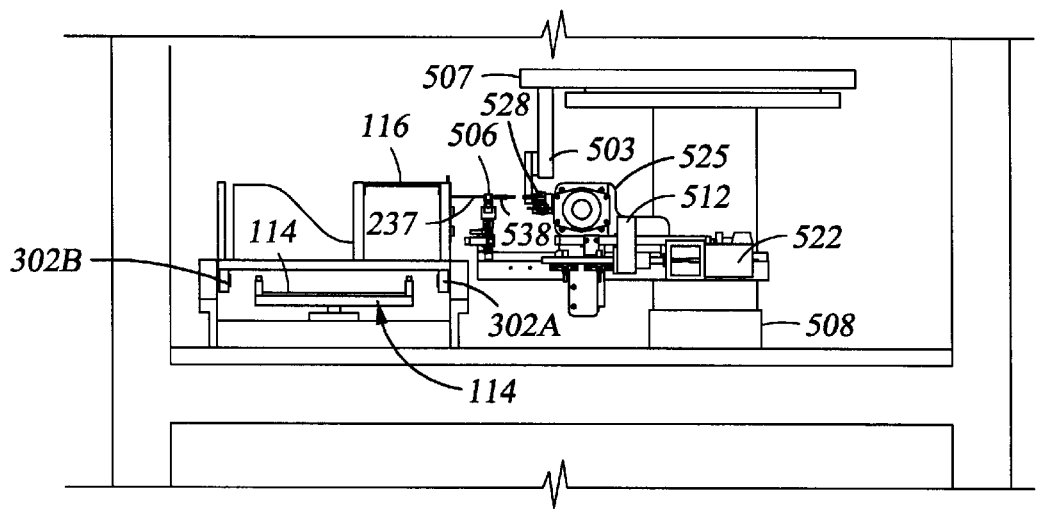
Figure 24:
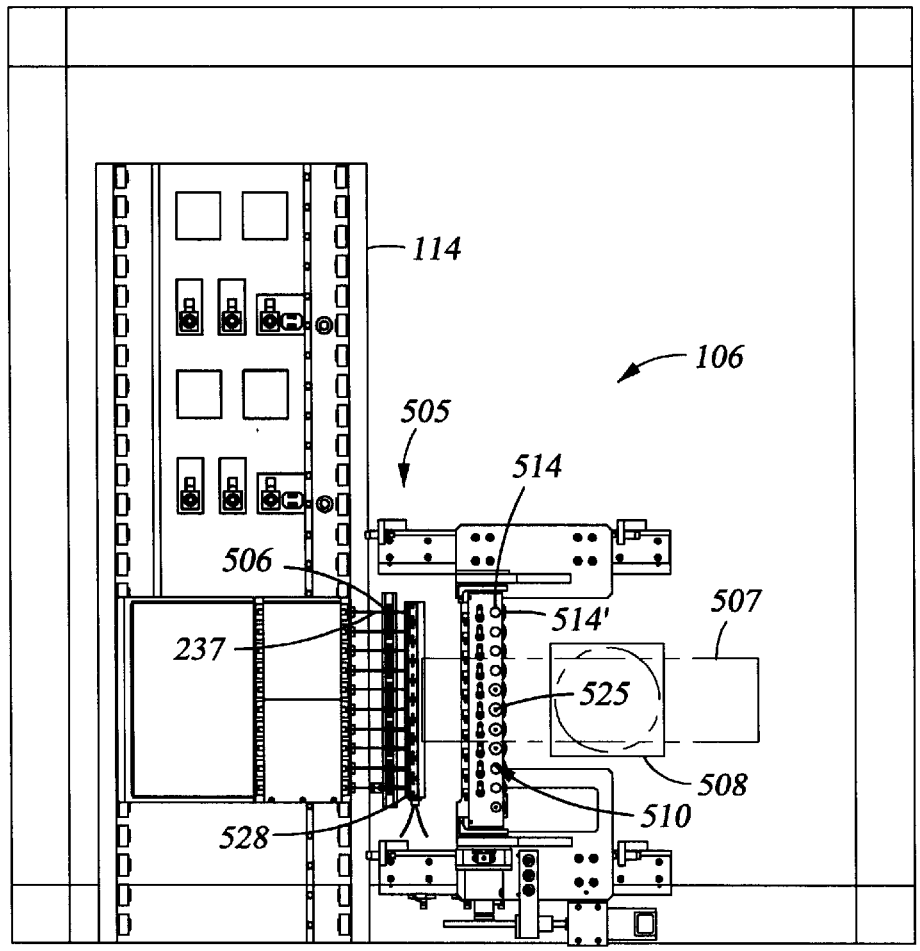
Figure 25:
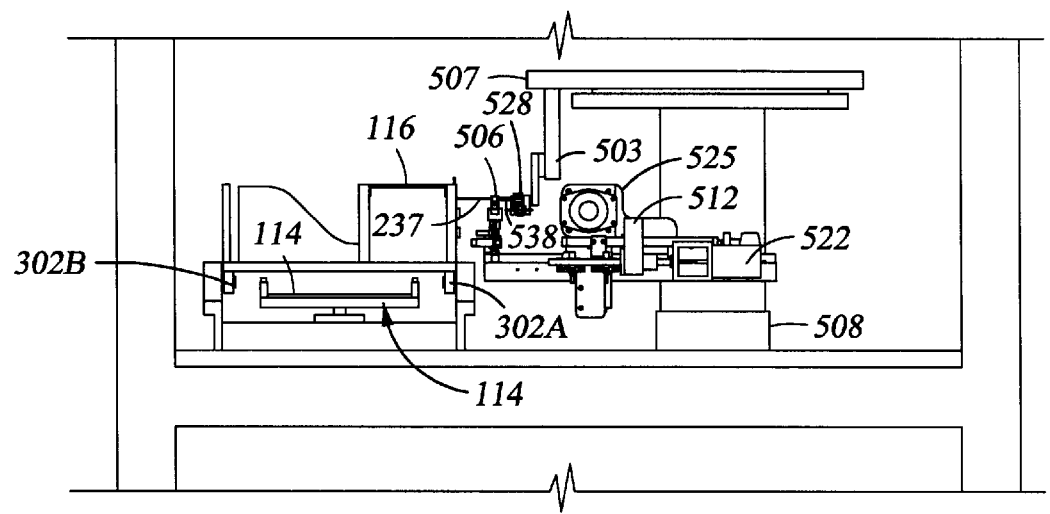

In another aspect, the components 538 and/or the fiber optic cable 237 include epoxy therein to bond the fiber optic cable 237 to the mating component 538. FIGS. 20 and 21 illustrate the component attachment tool 510 moved into an attachment position by the movable attachment assembly 512. FIGS. 22 and 23 illustrate the components 538 after attachment. In one aspect, when epoxy is used, an epoxy curing apparatus 528 may be used to cure the epoxy. In another aspect, the epoxy curing apparatus 528 heats the attached components 538 and fibers 237 to cure the epoxy therebetween. FIGS. 15, 24, and 25 illustrate one type of epoxy curing apparatus 528 positioned by a positioning apparatus (not shown) in an epoxy-curing position including the components 538 therein. To facilitate a uniform epoxy heat-curing process, the epoxy curing apparatus 528 may be adapted to clamp around the components 538 to impart heat more evenly.

As illustrated in FIGS. 15–25, to increase throughput, the component attachment tool 510, when rotated in an attachment position, may include an alternative component loading position where a plurality of secondary component holding recesses 514' are positioned vertically to accept components for a subsequent attachment process. Thus, when the attachment process is complete the component attachment tool 510 rotates to align the next set of components 538' for a subsequent attachment step.

Fiber Trim

Figure 26:
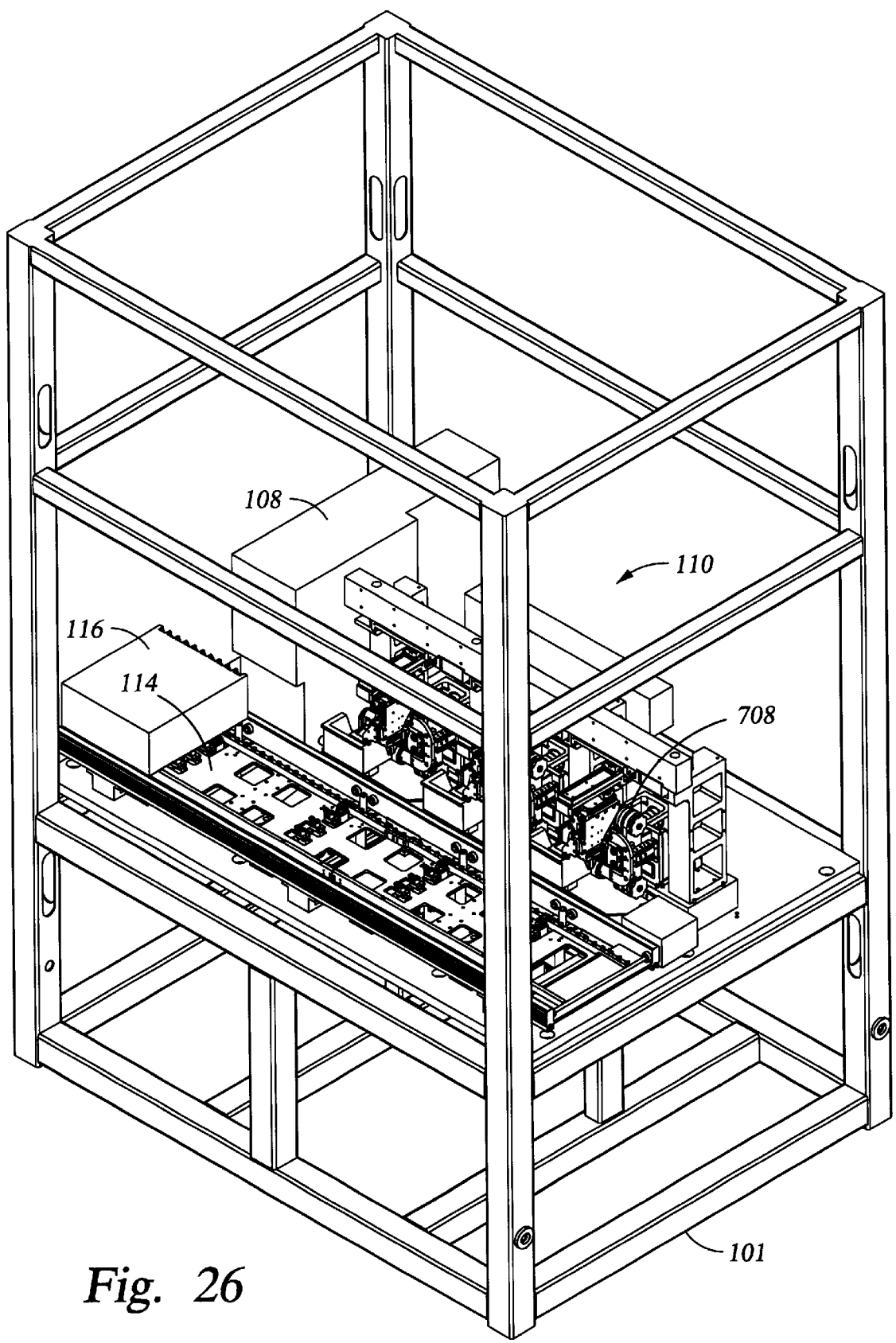
FIG. 26 illustrates a perspective view of an exemplary embodiment of an optical fiber trim stage and a polishing stage of FIG. 1.
Figure 27:
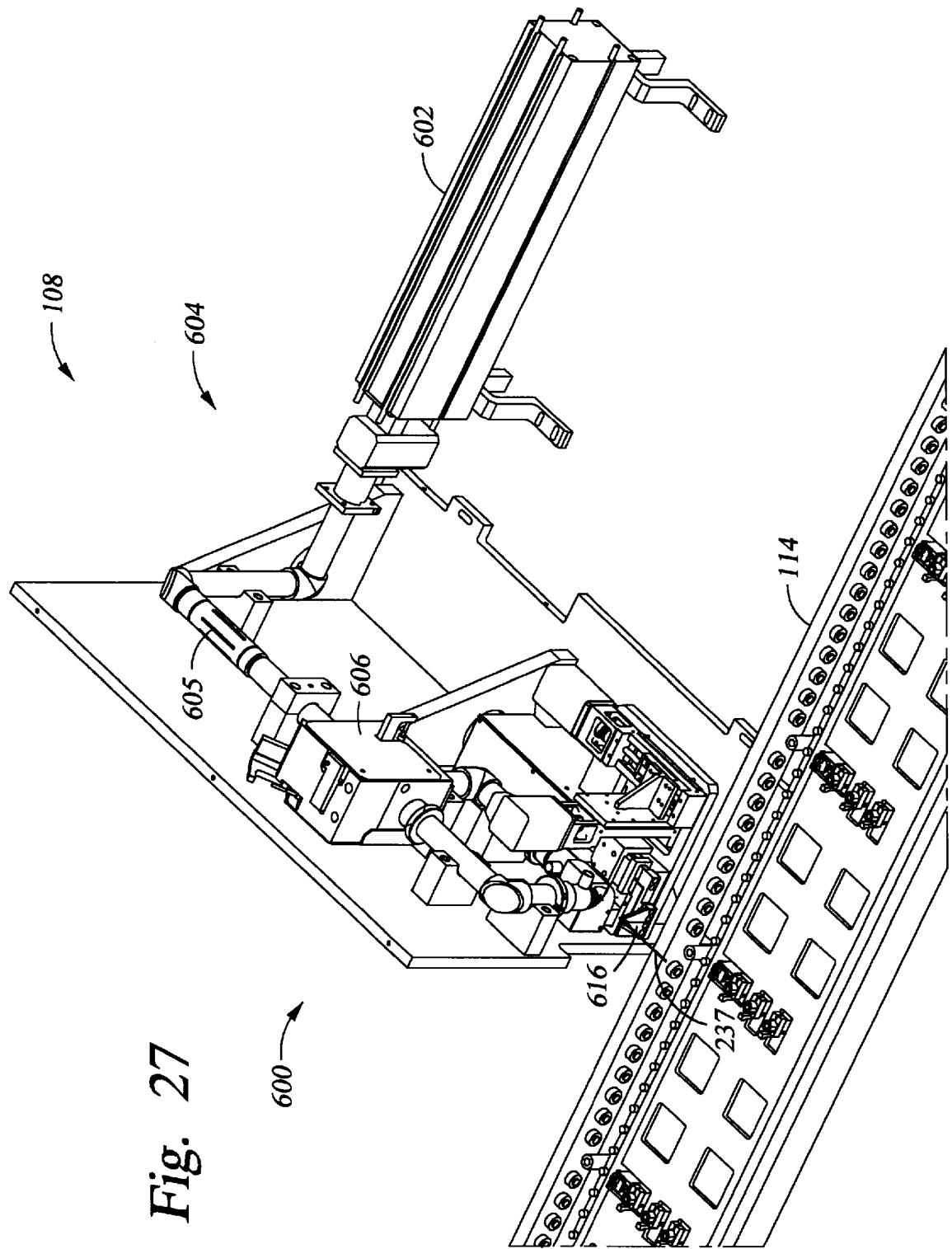

FIG. 26 is a perspective view of one embodiment of an optical fiber trim stage 108 and a polishing stage 110 of FIG. 1. FIGS. 27 and 28 are a perspective view and a side view, respectively, of one embodiment of the optic fiber trim stage 108 adjacent the optical component transport system 114. The fiber trim stage 108 includes a laser-cutting tool 600 adapted to trim and cut the excess core and cladding of an exposed portion of a fiber optic cable extending from an optical component, e.g., a ferrule, to develop a generally smooth optical interconnect surface. The laser-cutting tool 600 generally includes a laser source 602 and a laser splitter assembly 604 adapted to position one or more laser beams on a fiber optic cable. In one aspect, the laser source 602 may be any coherent laser light source adapted to burn away the fiber optic cable protruding from and adjacent an optical interface portion of the optical component. As illustrated in FIG. 28, the laser splitter assembly 604 includes a first laser transmission path 605 coupled on one end to the laser source 602, and on another end to a splitter 606. The splitter 606 includes a first split transmission path 608 and a second transmission path 609 for guiding a first and second split laser beam 620 and 621 therein, respectively. The first and second split transmission paths 608–609 are coupled on a distal end to a first laser light positioning member 610. The laser light positioning member 610 is adapted to position the first and second split laser beams 620–621. In one aspect, the laser light positioning member 610 aligns one laser beam 620 about orthogonal to a protruding fiber optic cable and/or exposed cladding and core. In another aspect, the laser light positioning member 610 aligns the other laser beam 621 about axially with respect to the longitudinal axis of the fiber optic cable and/or exposed cladding and core.

The laser-cutting tool 600 may further include a trim positioning apparatus 614 moveably disposed on a frame member 611 and being adapted to hold and position a component 538 for processing. In one aspect, the component 538 is held by a trim pincher 616 disposed on the trim positioning apparatus 614. The trim positioning apparatus 614 may include a horizontal trim motor 618 and a vertical trim motor 619 adapted to move the trim pincher 616 vertically and horizontally between a plurality of processing positions. In operation, the trim positioning apparatus 614 moves a component 538 attached to a fiber optic cladding and core, from the optical component carrier 116, between a pre-process position to a trim process position. Subsequently, a protruding length of the fiber optic cladding and core extending from the surface of the component is trimmed (e.g., burned) away from the surface of the optical component 538 by using the first and/or second laser beam 620–621.

Component Interface Polish

Figure 29:
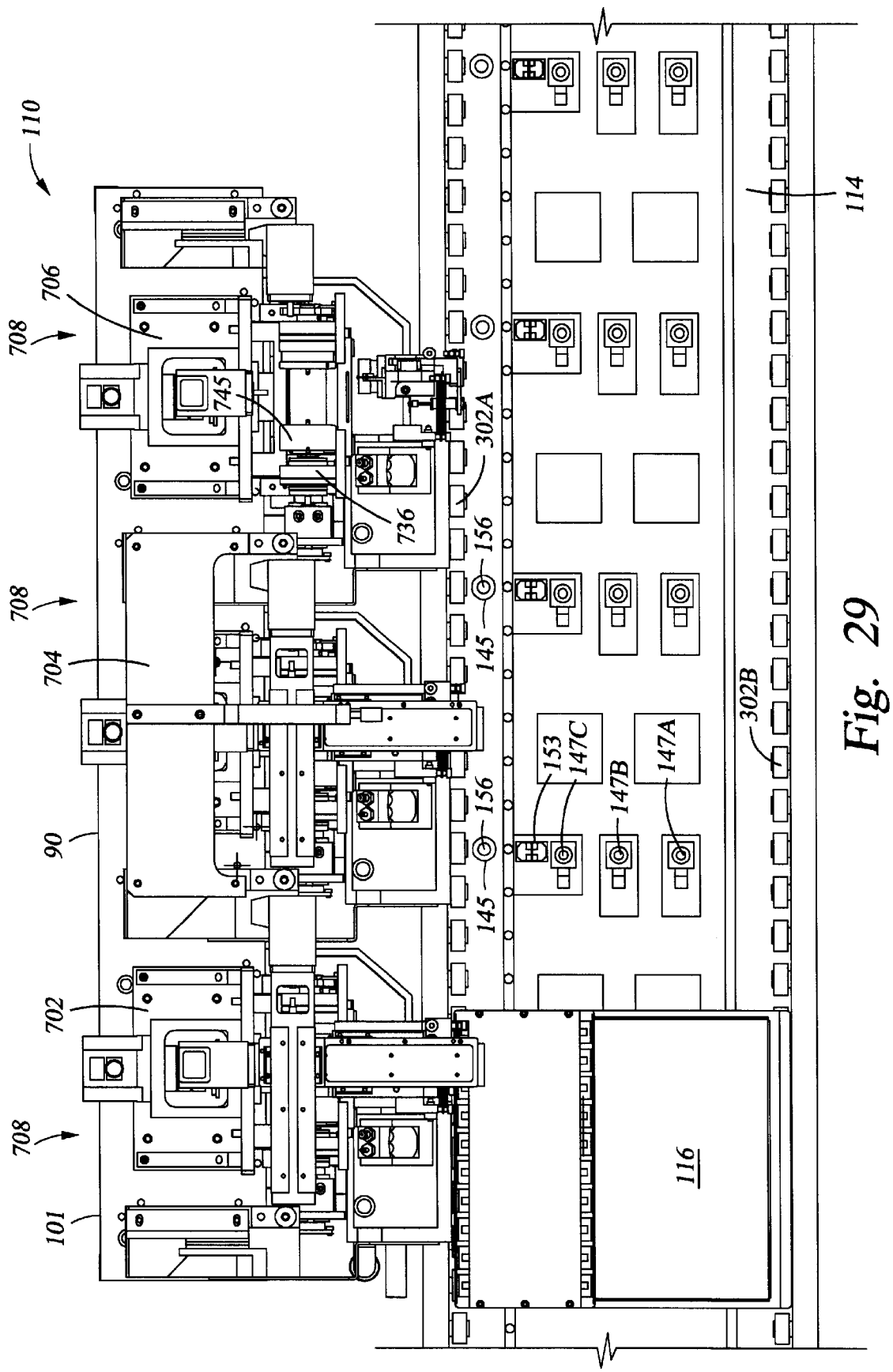
FIG. 29 illustrates a top view of the staged optical-subsystem polishing system of FIG. 26.

FIGS. 29–33 illustrate an exemplary embodiment of the staged optical-subsystem polishing system 110 of FIG. 1, adjacent the optical assembly transport system 114. FIG. 29 is a top view the staged optical-subsystem polishing system 110. The exemplary optical component polishing system 110 may generally include three polishing apparatuses 708 that provide three optical component polishing stages, which may be a coarse polishing stage 702 where optical components are given an initial coarse polish, a fine polishing stage 704 where optical components are given a finer polish than the initial coarse polish, and a finish polishing stage 706 where optical components are given a finish polish. The optical components are generally polished at each stage using a web of polishing material having a polishing surface thereon, that may be manufactured from materials such as silicon-carbide, diamonds, silicon-dioxide, and other polishing materials. In one aspect, after the coarse and fine polishing stages, the component is cleaned with de-ionized water. Subsequently, an inert pressurized gas, such as $CO_2$, for example, may be used as a cleaning agent to remove any fine residue adhering to the optical surfaces produced during the polishing process. The polishing apparatus 708 may be used to polish the optical interconnect surfaces of optical components, e.g., ferrules.

Figure 30:
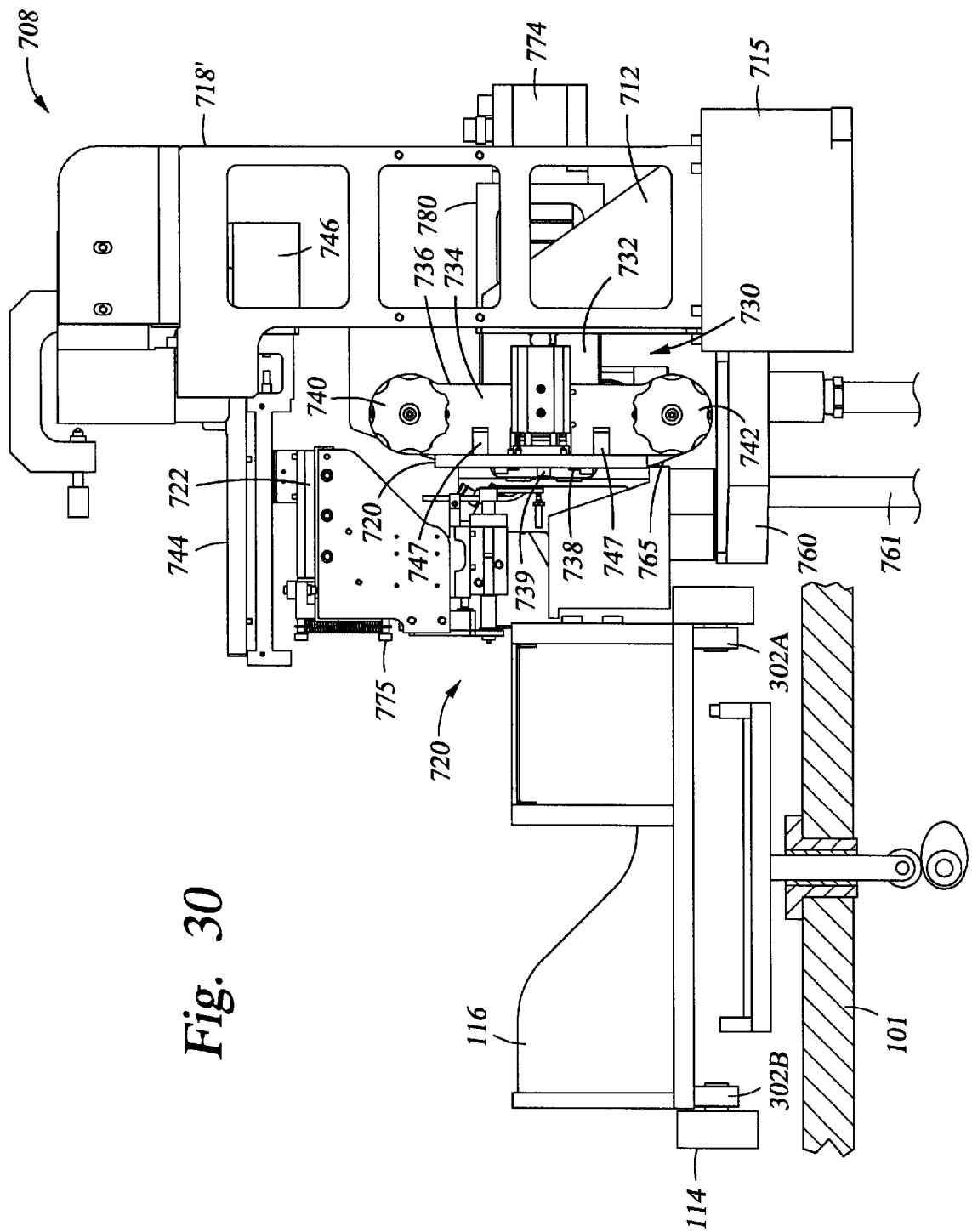
FIG. 30 illustrates a side view of an optical-subsystem polishing tool of FIG. 26.
Figure 31:
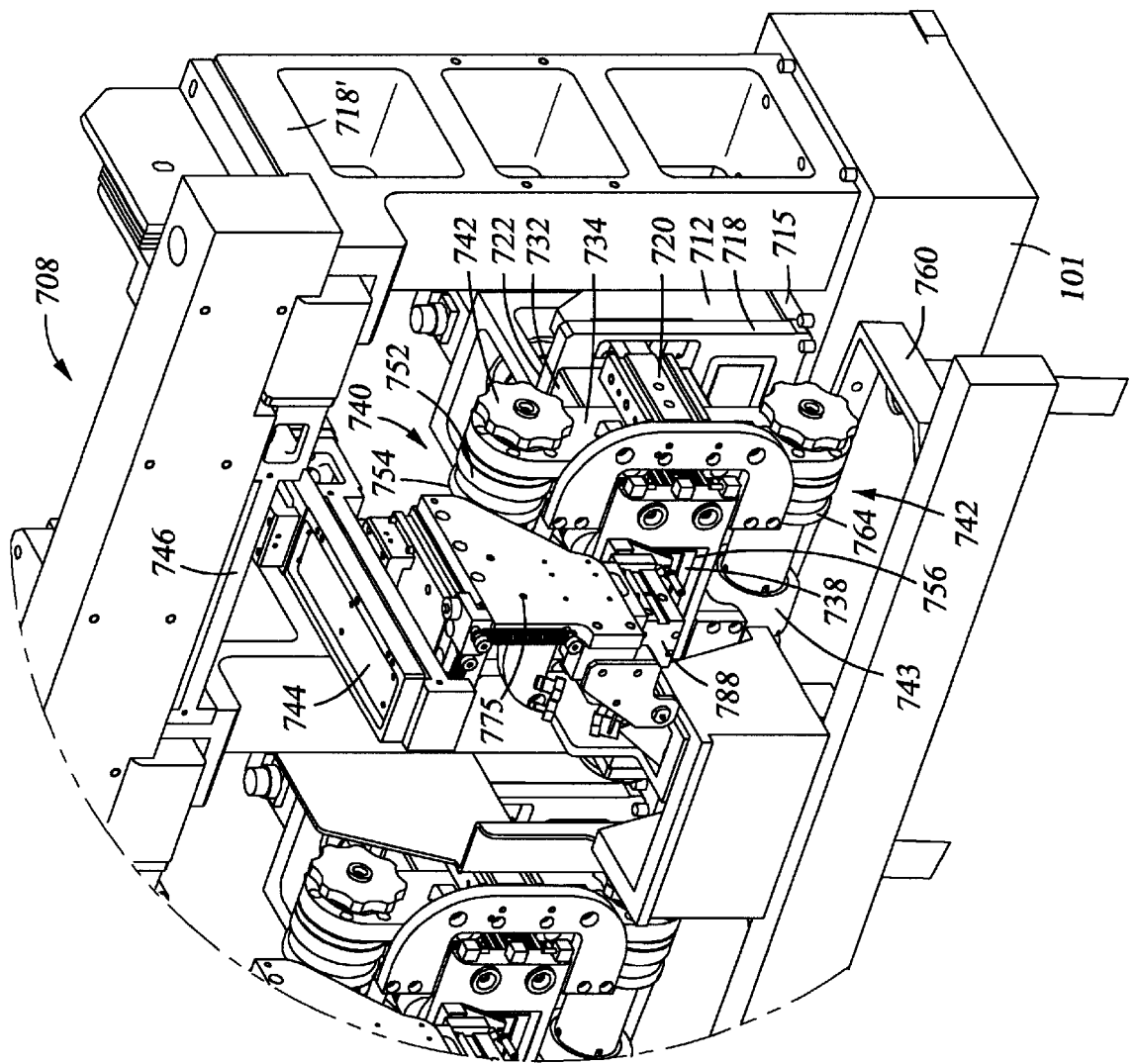
FIG. 31 illustrates cut away perspective view of one embodiment of an optical-subsystem polishing tool of FIG. 30.

FIGS. 30–31 illustrate a side and perspective view, respectively, of a polishing apparatus 708 that may include a body 712, a support 718, and a mounting plate 715. FIG. 29 may be referenced with the discussion of FIGS. 3031. In one aspect, the body 712, support 718, frame 101, and mounting plate 715 are mounted to each other using conventional fasteners such as screws, bolts, nuts, and the like, and in another aspect may be a single component. While in another aspect, the support 718 is vertically mounted on the mounting plate 715 to define a vertical polishing position for an orbital assembly 720 to help in the removal of polishing debris, it is contemplated that the orbital assembly 720 may mounted in any position to perform the same polishing function. In one aspect, a collection tray 760 is disposed under the orbital assembly 720 to collect debris and fluids during processing. The tray 760 is coupled to a drain 761 that is fluidly coupled to a waste collection system or container (not shown).

As illustrated in FIGS. 29–30, the orbital assembly 720 includes a polishing assembly 730 and a spacer 732 flexibly coupled to the polishing assembly 730 and rigidly mounted to the support 718. The polishing assembly 730 is positioned to allow the optical component to be polished at generally an orthogonal direction relative the support 718. The polishing assembly 730 includes a right and left side plate 734,736, respectively, adapted to support a polishing table 738, a polishing material supply apparatus 740, and a polishing material receiver 742. In one aspect, the polishing table 738 is formed from a rigid material having a low coefficient of friction, such as Teflon® impregnated aluminum, stainless steel, or other materials having a low friction surface thereon. In another aspect, the low friction surface may be applied to the polishing table 738 as a coating thereon. The polishing table 738 also includes a polishing surface recess 739 formed therein. In operation, a web of polishing material 765 is disposed over the polishing table 738 proximate the recess 739 and between the polishing material supplier 740 and polishing material receiver 742. Generally, the polishing table 738 is adapted to orbitally rotate within the polishing assembly 730 to polish optical component optical interfaces.

As illustrated in FIG. 31, in one aspect, the polishing material supply apparatus 740 includes a brake 752 and is adapted to support a roll of polishing material 765 thereon (see FIG. 30). The brake 752 applies a frictional force to the polishing material supply apparatus 740, which keeps the roll of polishing material 765 taught. The polishing material supply apparatus 740 further includes a supply clutch 754 to control the dispensing of the polishing material 765 from the polishing material supply apparatus 740. As illustrated in FIG. 31, the polishing material receiver 742 is coupled to a receiver clutch 764 mounted to the left side plate 736. The receiver clutch 764 constrains the web of polishing material movement to only one direction from the polishing material supply apparatus 740 to the polishing material receiver 742. The polishing material receiver 742 is rotated by a drive apparatus 743 (see FIG. 29) to take up and thereby advance the polishing material 765 across the polishing table 738. In one aspect, the supply clutch 754, drive apparatus 743, and brake 752 are operated together to control the advancement of the web of polishing material 765 while maintaining a taught web of polishing material 765 across the polishing table 738. As such, the polishing material 765 contacting optical components may be refreshed as needed via advancement of the polishing material from the supply apparatus 740 to the receiver 742.

Figure 32:
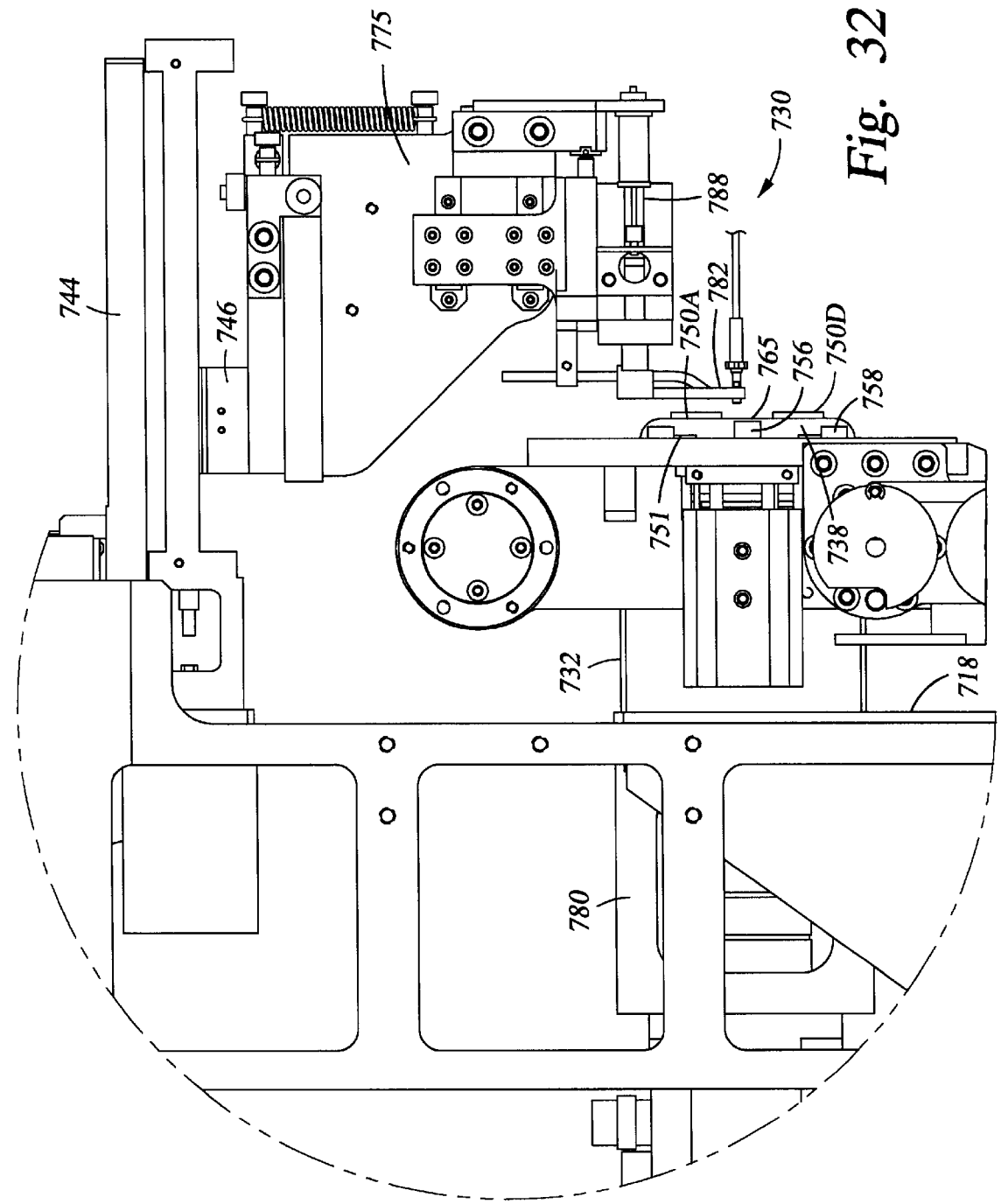
FIG. 32 illustrates a cut away side view of the optical-subsystem polishing tool of FIG. 30.
Figure 33:
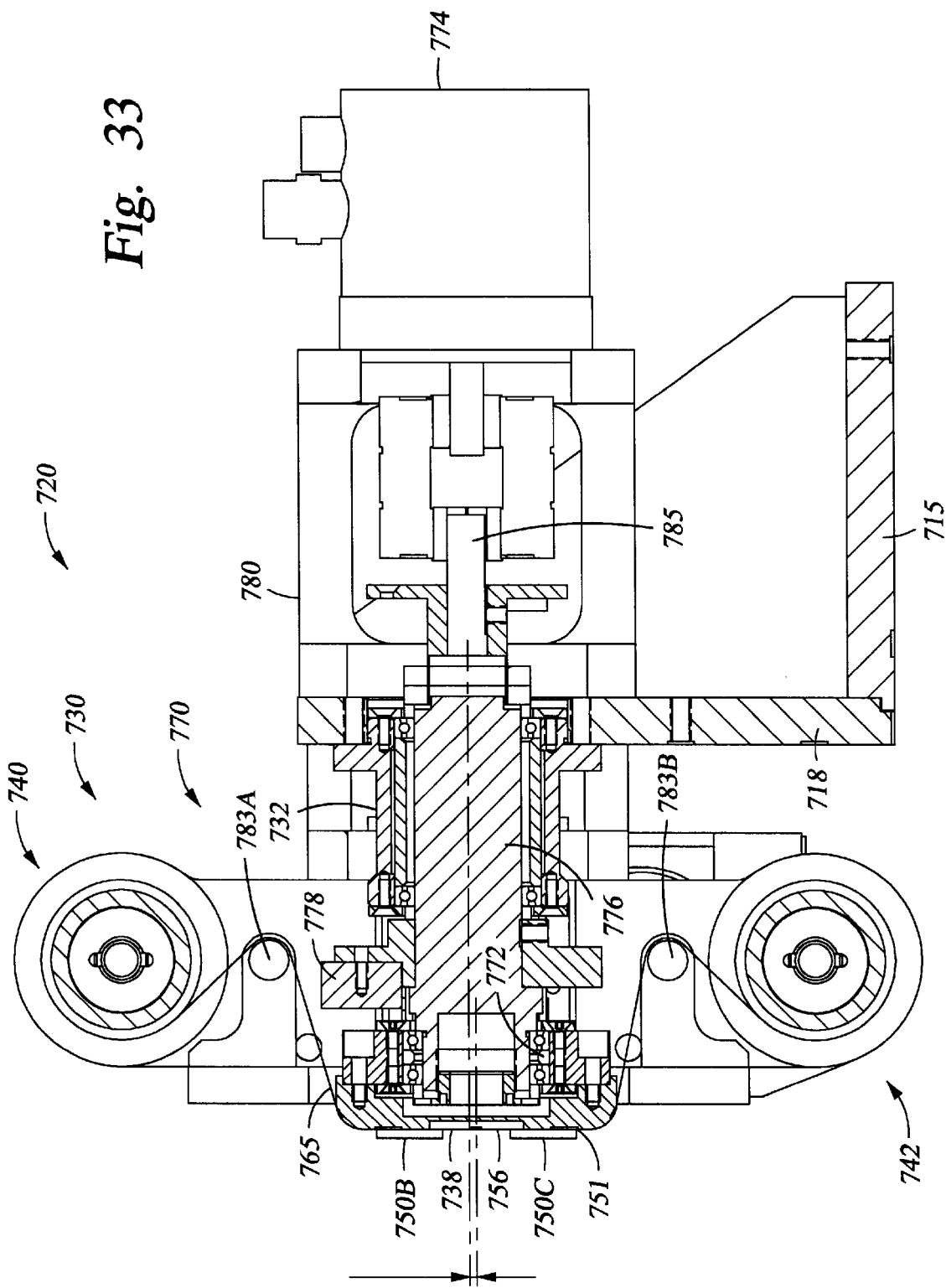
FIG. 33 illustrates a cut away side view of the optical-subsystem polishing tool of FIG. 30 illustrating an optical component in a processing position.

FIGS. 32–33 are a partial cut away side view and side view respectively of one embodiment of the polishing assembly 730. FIGS. 29–31 may be referenced with the discussion of FIGS. 32–33. In one aspect, the polishing assembly 730 is coupled to an orbital actuator 770 to move the polishing table 738 in an orbital motion about a polishing plane that is generally orthogonal to the surface of the optical component being polished. The orbital actuator 770 includes a drive frame 780 supporting a motor 774 coupled to an eccentric shaft 776 extending generally perpendicular through the support 718. One end of the eccentric shaft 776 is rotatably coupled to the polishing table 738 via a bearing 772. One or more counter balances 778 are disposed on the eccentric shaft 776 to offset the centrifugal and centripetal forces developed by the non-uniform mass distribution of the polishing table 738 during operation, thereby minimizing vibration.

As the eccentric shaft 776 axially spins, it orbitally rotates about a motor shaft center 785. As the bearing 772 generally provides some rotational friction, the polishing table 738 is rotationally urged about the shaft 776 in the direction of the shaft rotation. To rotationally constrain the polishing table 738, while allowing the polishing table 738 to simultaneously move with the orbital rotation of the eccentric shaft 776, four flexible supports 750A–D are rotatably mounted on one end to the spacer 732 and on an opposite end to the polishing table 738. Thus, in operation, the polishing table 738 moves in an orbital fashion about the shaft 776 while maintaining a generally parallel position with respect to the support 718. In one aspect, to minimize the tension and allow for flexure of the polishing material and 765 during processing, a pair of rotatable strain relief members 783A and 783B are in rotatable engagement with the polishing material 765.

As illustrated in FIG. 32, a component support 782, used to support optical components during processing, is mounted by a support 775 to a polishing force apparatus 744. The polishing force apparatus 744 is used to position and force optical components held by the component support 782 against the polishing material 765 (see FIG. 33). The polishing force apparatus 744 may be any apparatus such as a motor driven actuator adapted to move the component support 782 generally perpendicular toward and away from the polishing table 738, and as needed, during a polishing operation, maintains pressure of the optical component against the polishing material 765. The polishing force apparatus 744 may be slidably mounted to a polishing position apparatus 746 which may be mounted to an upper end 722 of a secondary support 718 prime. The polishing position apparatus 746 may be any apparatus such as a motor driven actuator adapted to laterally move the component support 782 generally parallel to the polishing table 738 and across the surface of the polishing material 765. In one aspect, as illustrated in FIG. 31, the component support 782 is independently secured to a secondary support 718' mounted to the frame 101 to provide vibration isolation from the polishing assembly 730. In another aspect, the polishing force apparatus 744 and polishing position apparatus 746 are mounted to the support 718, 718' via flexible mounting fasteners such as rubber, vinyl, plastic, nylon, and the like, adapted to provide vibration damping therebetween.

In one aspect, (see FIG. 30) an air inlet/outlet 747 is disposed on the right side plate 734, in communication with the polishing table 738, and coupled to air conduction channels (not shown) that extend through the polishing table 738. The air conduction channels are coupled to a plurality of holes 751 (see FIG. 32) disposed around the recess 739 within a groove 758. A vacuum pressure may be provided to the groove 758 via the air inlet/outlet 747 through the holes 751 to hold the web of polishing material 765 to the polishing table 738 during a polish process. In one aspect, the holes 751 may be distributed throughout the recess 739 and/or the groove 758 to allow the recess 739 under vacuum to hold the web of polishing material 765 to the polishing table 738. In another aspect, air pressure may be provided from the air inlet/outlet 747 to the holes 751 during a polish material cleaning/renewing process to force the polishing material 765 away from the polishing table 738 releasing debris and/or allowing the polishing material 765 to be dispensed from the polishing material supply apparatus 740 to the polishing material receiver 742.

In one aspect, the component support 782 further includes a sensor assembly 788, adapted to measure the polishing pressure of the optical component against the polishing material 765 during a polishing process and provide a signal to the process controller 118 indicative of the polishing pressure. In operation, the polishing force apparatus 744, sensor assembly 788, and process controller 118 form a polishing pressure feedback system to maintain a generally constant pressure between the optical component, polishing material 765, and the polishing table 738 throughout the polishing process.

In another aspect, as illustrated in FIG. 32, a sub-pad 756 typically composed of a flexible material such as rubber, vinyl, resin, plastic, and other suitable flexible material, that provides a flexible, but firm, polishing surface, may be disposed in the recess 739. The sub-pad 756 is also adapted to provide a desired amount of flexure and resistance under the polishing material 765 against the component to form a desired radius of curvature for the optical surface being polished. In one aspect, the sub-pad 756 is adapted to form a radius of curvature dependant upon the pressure developed between the surfaces being polished, polishing material 765, and the sub-pad 756. For example, a lighter pressure between an optical component being polished, polishing material 765, and the subpad 756 provides for a flatter (i.e., smaller) radius of curvature whereas a greater pressure provides for a rounder (i.e., larger) radius of curvature. In another aspect, to provide for a greater polishing pressure to form a desired radius of curvature while decreasing the polishing time required, the sub-pad 756 includes a firmer surface having more flexure resistance thereon. It is contemplated that the compliance and resilience of the sub-pad 756 may be selected to provide any desired radius of curvature, flexure, and processing time.

Component Testing

Figure 34:
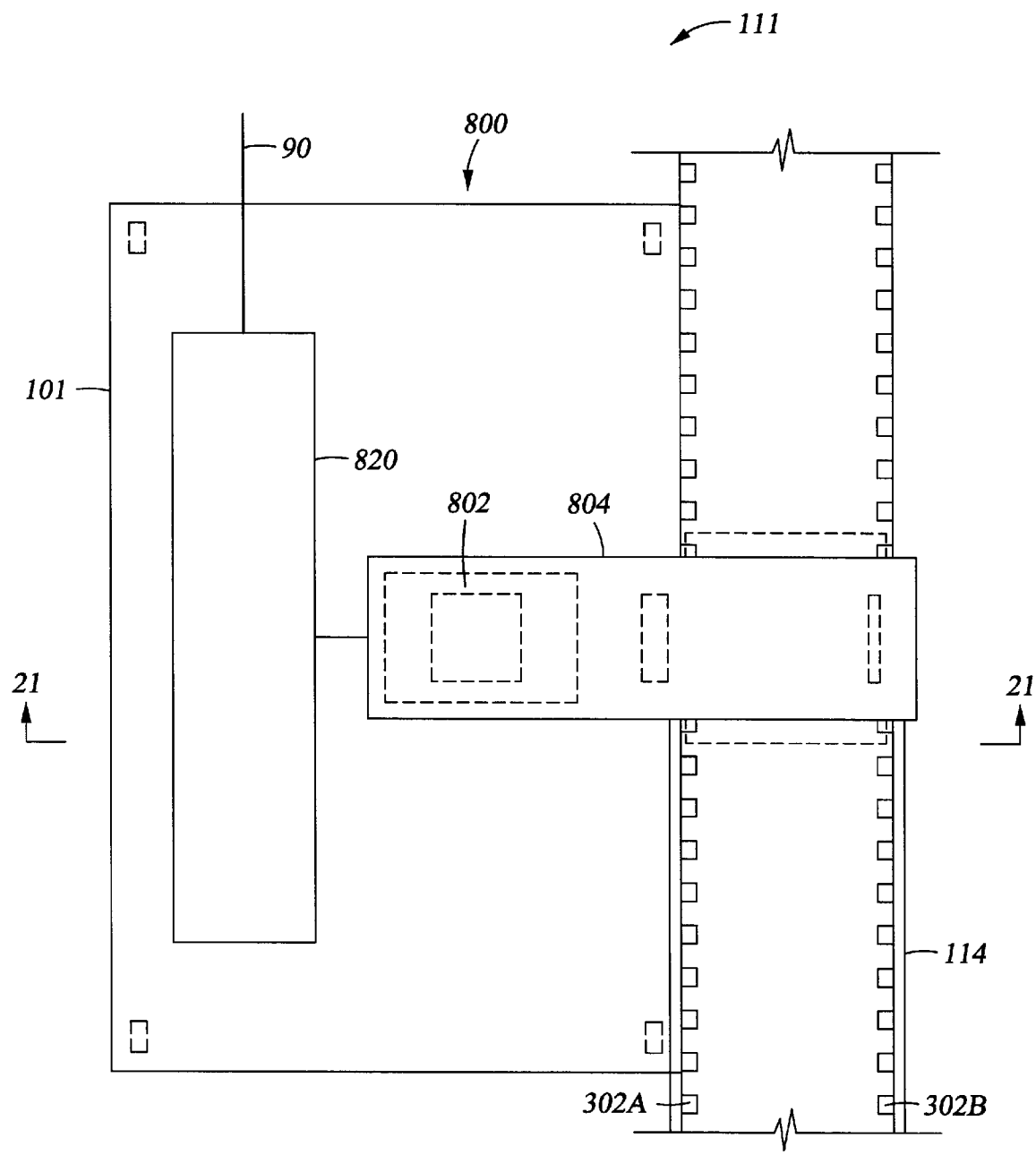
FIG. 34 illustrates a top view of an exemplary embodiment of an optical-component testing stage of FIG. 1.
Figure 35:
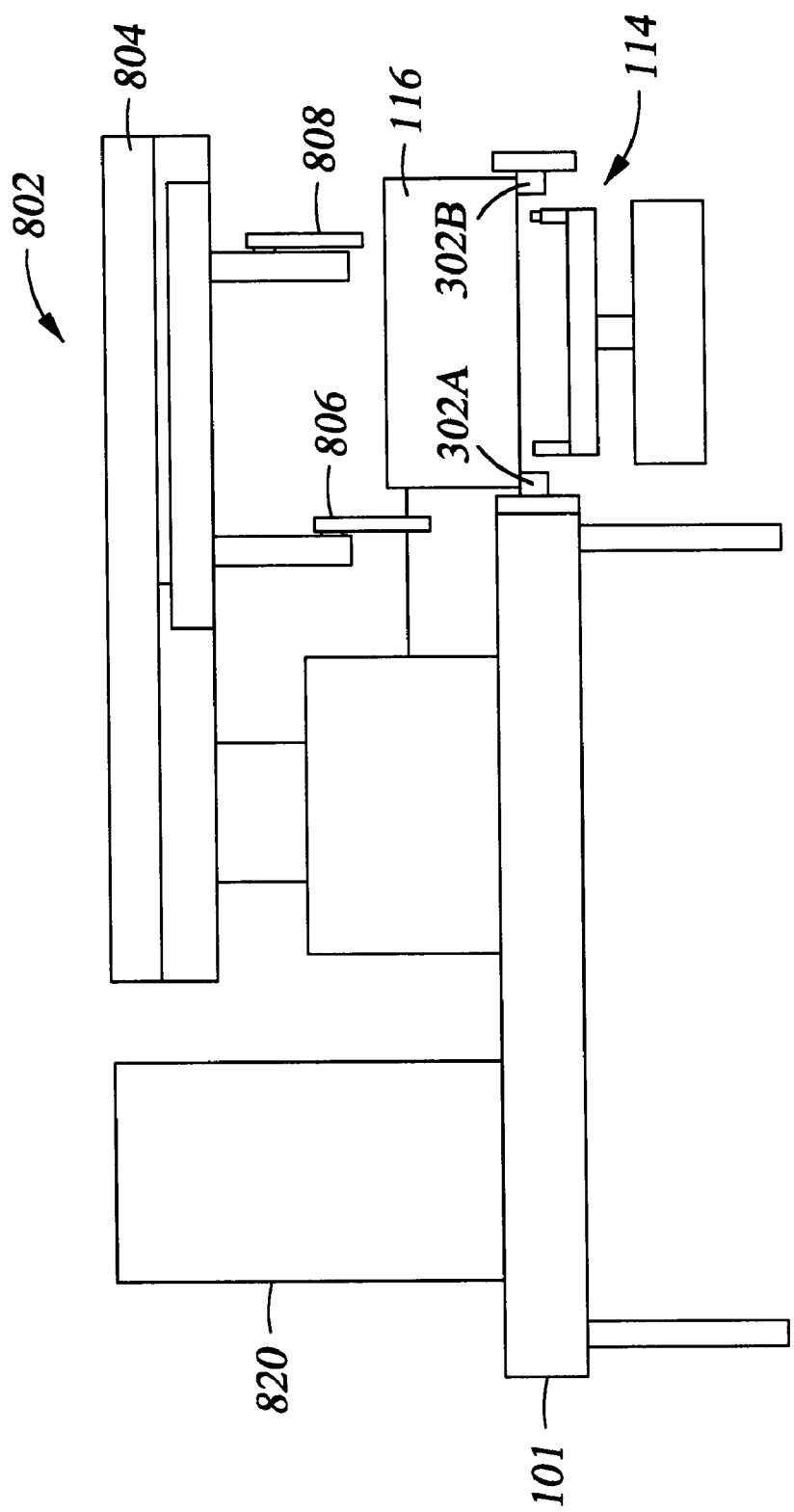
FIG. 35 illustrates a side view of the optical-component testing stage of FIG. 34.

FIGS. 34 and 35 are a simplified plan view and a side view, respectively, of one embodiment of the optical assembly testing stage 111. The optical assembly testing stage 111 is disposed adjacent the optical carrier transportation system 114 to facilitate the automatic testing of a plurality of assembled optical components. The optical assembly testing stage 111 may include a number of different optical component testing tools 800 (one is shown). The optical component carriers 116 move along the optical carrier transportation system 114 and are positioned adjacent the optical component testing tool 800 that includes at least one powered component testing stage 802 interfaced to a optical testing equipment module 812. The powered component testing stage 802 may generally include a test robot 804 that has a test pincher 806 adapted to move one or more of terminated fiber optic assemblies to a processing position. In one aspect, the powered component testing stage 802 includes a component stimulation tool 808 that is adapted to provide power and signals to the components within the optical component carrier 116. The powered component testing stage 802 may also include an optical interface front end 812 adapted to receive an optical component, e.g., a ferrule. In one aspect, the component stimulation tool 808 may be adapted to mate with the optical component carrier 116 such that the stimulation signals and power (e.g., bias) from the component stimulation tool 808 are transmitted to the components within the optical component carrier 116. For example, an attenuation module may be located within the optical component carrier 116. The component stimulation tool 808 provides the electrical power and the signals necessary to operate the attenuation module. The component end of the cable 237 may be inserted into the component interface front end 812. Test signals from the component interface 812 may then be transmitted to the component testing system 820 for analysis. In another aspect, the testing system 820 is adapted to verify if the optical interface and or optical component is defective. In another aspect, the process controller 118 controls the testing process and equipment.

Although various embodiments which incorporate the teachings of the invention have been shown and described in detail herein, those skilled in the art can readily devise many other varied embodiments within the scope of the invention. For example, it is contemplated that the staged optical component processing system 100 may be configured to simultaneously process a plurality of different types of optical components and components either serially or in parallel. For example, a fiber optic switch including a plurality of pigtail fiber optic cables may be processed simultaneously with a fiber optic amplifier having a single fiber optic pigtail. Therefore, while foregoing is directed to exemplary embodiments of the invention, other and further embodiments of the invention may be devised without departing from the basic scope thereof, and the scope thereof is determined by the claims that follow.

What is claimed is:

1. An apparatus for processing optical subassemblies, comprising:
    a component installation stage adapted to assemble a plurality of components onto a plurality of fiber optic cables;
    a fiber preparation stage adapted to remove an outer coating of an optical fiber to expose an optical fiber cladding and a core;
    a component attachment stage adapted to attach at least one optical component on the optical fiber cladding and the core;
    an optical surface polishing stage adapted to polish an optical interface surface; and
    at least one movable optical component carrier adapted to transport the plurality of fiber optic cables and the plurality of components between the component installation stage, the fiber preparation stage, the component attachment stage, and the optical surface polishing stage.

2. The apparatus of claim 1, wherein the component installation stage comprises:
    a plurality of vertically aligned component dispensing tubes adapted to hold the plurality of components; and
    at least one component transfer tool adapted to transfer at least one of the plurality of components from the plurality of vertically aligned component dispensing tubes to at least one of the plurality of fiber optic cables.

3. The apparatus of claim 2, further comprising a component feeder assembly having a component dispensing tool adapted to dispense the at least one of the plurality of components from the plurality of vertically aligned component dispensing tubes.

4. The apparatus of claim 1, wherein the fiber preparation stage comprises a fiber stripping tool having a fiber puller adapted to pull the optical fiber from the at least one movable optical component carrier a desired distance to expose a length of the optical fiber to be stripped.

5. The apparatus of claim 4, wherein the fiber stripping tool comprises a first and second clamp member adapted to clamp the optical fiber therebetween, the first clamp member having a first heating element and the second clamp member having a second heating element, wherein the first and second heating elements are adapted to melt the outer coating to expose the fiber optic cladding and the core.

6. The apparatus of claim 1, wherein the component attachment stage comprises a fiber gripper assembly having at least one of the plurality of fiber optic cables therein.

7. The apparatus of claim 6, wherein the gripper assembly includes a component attachment tool having a first component holding member, wherein the first component holding member having a plurality of recesses adapted to hold one or more of the plurality of components.

8. The apparatus of claim 7, wherein the gripper assembly is rotatably mounted to a moveable attachment apparatus adapted to move the gripper assembly between a plurality of attachment positions.

9. The apparatus of claim 7, wherein the component attachment tool includes a component rotation assembly adapted to axially rotate one of the one or more plurality of components within one of the plurality of recesses.

10. The apparatus of claim 7, wherein the component attachment tool further comprises a second component holding member having a second plurality of recesses adapted to hold a second set of the one or more of the plurality of components therein.

11. The apparatus of claim 6, wherein the component attachment tool further comprises an epoxy curing apparatus having a component heating apparatus adapted to heat one or more of the plurality of components.

12. The apparatus of claim 1, wherein the at least one movable optical component carrier comprises:
    a body having a top, a bottom, and a sidewall member that cooperatively define an component storage region;
    at least one component storage device; and
    at least one gripper disposed in the sidewall member and adapted to grip one of the plurality of components or one of the plurality of fiber optic cables.

13. The apparatus of claim 12, wherein each of the at least one component storage devices comprise an annular component holder and two outer covers disposed about the annular component holder, the two outer covers forming a flexible fiber optic cable clamp therebetween.

14. The apparatus of claim 1, further comprising a fiber trim stage, wherein the fiber trim stage includes at least one laser cutting tool having at least one laser beam source adapted to burn an excess of the optical fiber cladding and the core extending from the optical interface surface.

15. The apparatus of claim 14, wherein the laser cutting tool further comprises a laser beam splitter assembly adapted to direct one or more laser beams onto the fiber optic cladding and the core.

16. The apparatus of claim 15, wherein the laser beam splitter assembly further comprises a first and a second laser beam transmission paths wherein the first laser beam transmission path directs a first laser beam orthogonally to a longitudinal axis of a first of the plurality of fiber optic cables, and wherein the second laser transmission path directs a second laser beam parallel to the longitudinal axis of the first of the plurality of fiber optic cables.

17. The apparatus of claim 1, wherein the optical surface polishing stage includes at least one polishing tool comprising:
    a polishing table and a polishing material supply apparatus adapted to supply a web of polishing material proximate the polishing table;
    an orbital actuator rotatably coupled to the polishing tool and adapted to actuate the at lest one polishing tool in an orbital motion; and
    a component support adapted to position the optical interface surface of an optical component in contact with polishing material adjacent the polishing table.

18. The apparatus of claim 17, wherein the polishing material supply apparatus is coupled to a polishing material receiver with a web of polishing material.

19. The apparatus of claim 18, wherein the polishing material supply apparatus further comprises a drag apparatus adapted to provide drag and tension to the web of polishing material.

20. The apparatus of claim 17, wherein the orbital actuator further comprises a motor coupled to an eccentric shaft that is coupled to the polishing tool.

21. The apparatus of claim 20, wherein the eccentric shaft comprises at least one counterbalance positioned on the shaft and sized to offset the centripetal and centrifugal forces generated during the orbital motion of the polishing tool.

22. The apparatus of claim 1, further comprising a component testing stage having a optical component testing tool having a test equipment module adapted to test at least one optical component.

23. The apparatus of claim 22, wherein the optical component testing tool comprises a component stimulation tool adapted to provide power and stimulation signals to at least one optical component.

24. The apparatus of claim 1, further comprising a carrier transport system adapted to facilitate movement of the at least one movable optical component carrier between at least two processing stages.

25. The apparatus of claim 24, wherein the carrier transport system comprises a roller assembly driven by a conveyor drive, wherein the roller assembly is adapted to move and support the movable optical component carrier.

26. The apparatus of claim 24, wherein the carrier transport system comprises a positioning apparatus adapted to move and support the at least one movable optical component carrier between a plurality of processing positions with respect to the at least two processing stages.

27. The apparatus of claim 26, wherein the positioning apparatus further comprises a pedestal adapted to move the at least one movable optical component carrier in a three dimensional manner with respect to the at least two processing stages.

28. The apparatus of claim 26, wherein the positioning apparatus includes an indexing transport system comprising at least one indexing stop adapted to stop and position the at least one movable optical component carrier in a plurality of indexed processing positions with respect the at least two processing stages.

29. The apparatus of claim 28, wherein the indexing transport system includes a carrier support member comprising a cam apparatus and shaft member adapted to move the carrier support member and the at least one movable optical component carrier between a component transport position and a component processing position.

30. A system of processing stages for assembling optical interconnections to a plurality of fiber optic cables, comprising:
   a component installation stage adapted to assemble a plurality of components on the plurality of fiber optic cables;
   a fiber preparation stage adapted to remove an outer coating of an optical fiber to expose an optical fiber cladding and a core;
   a component attachment stage adapted to attach at least one optical component on the optical fiber cladding and core;
   a fiber trim stage adapted to trim a section of the optical fiber cladding and core protruding from the at least one optical component;
   a polishing stage adapted to polish an optical interface surface;
   a testing stage adapted to test the at least one optical component;
   at least one optical component carrier supported by a carrier transport system adapted to move the at least one optical component carrier between a plurality of the processing stages and a plurality of processing positions thereto; and
   a process controller adapted to control the plurality of processing stages.

31. The system of claim 30, wherein the process controller receives and transmits control signals to and from the plurality of processing stages.

32. The system of claim 30, wherein the component installation stage comprises at least one component transfer tool adapted to transfer at least one of the plurality of components from at least one component dispensing tube to at least one of the plurality of fiber optic cables.

33. The system of claim 30, wherein the fiber preparation stage comprises a stripping tool having at least two heated clamps, wherein the clamps are adapted to clamp around a portion of the optical fiber to be stripped and to heat the outer coating therebetween.

34. The system of claim 30, wherein the component attachment stage comprises a component attachment assembly having a fiber gripper assembly that includes at least one fiber pincher adapted to hold at least one of the plurality of fiber optic cables.

35. The system of claim 34, wherein the component attachment assembly includes a component attachment tool having a first component holding member having a plurality of recesses adapted to hold one or more of the plurality of components.

36. The system of claim 35, wherein the component attachment tool includes a component rotation assembly adapted to axially rotate one of the one or more plurality of components within one of the plurality of recesses.

37. The system of claim 34, wherein the component attachment assembly comprises a first and second set of component holding recess positioned so that when the first set of component holding recesses is in a component attachment position the second set of component holding recesses is in a component loading position.

38. The system of claim 34, wherein the component attachment assembly includes a fiber gripper assembly comprising a plurality of attachment pinchers, wherein each of the plurality of attachment pinchers are adapted to hold one of the plurality of fiber optic cables in axial alignment with the at least one optical component.

39. The system of claim 30, wherein the polishing stage includes at least one polishing tool comprising:
   a polishing table and a polishing material supply apparatus adapted to supply a web of polishing material proximate the polishing table;
   an orbital actuator rotatably coupled to the polishing tool and adapted to rotate the polishing tool in an orbital motion; and
   a component support adapted to position a surface of an optical component in contact with polishing material adjacent the polishing table.

40. The system of claim 39, wherein the polishing material supply apparatus is coupled to a polishing material receiver via a web of polishing material.

41. The system of claim 40, wherein the polishing material supply apparatus further comprises a drag apparatus adapted to provide drag and tension to the web of polishing material.

42. The system of claim 39, wherein the orbital actuator further comprises a motor coupled to an eccentric shaft rotatably coupled to the polishing tool.

43. The system of claim 42, wherein the eccentric shaft comprises at least one counterbalance device positioned on the shaft and sized to offset centripetal and centrifugal forces generated during the orbital motion of the polishing tool.

44. The system of claim 30, wherein the fiber testing stage comprises a component testing tool adapted to test optical subassemblies and being coupled to at least one optical interface front end.

45. The system of claim 44, wherein the component testing tool comprises a component stimulation tool adapted to mate with the at least one optical component carrier such that at least one stimulation signal and bias is transmitted from the component stimulation tool to at least one optical component within the at least one optical component carrier.

46. The system of claim 30, wherein the at least one optical component carrier is adapted to hold at least one component storage apparatuses comprising a component holder and two outer covers disposed about the component holder, wherein the two outer covers form a flexible fiber clamp therebetween.

47. The system of claim 46, wherein the at least one optical component carrier comprises:
   a body including a top, a bottom, and a sidewall member that cooperatively define a component storage region;
   at least one storage slot adapted to hold a fiber optic cable and the plurality of components; and
   a gripper disposed in the sidewall member and adapted to hold one of the plurality of fiber optic cables or plurality of components.

48. A method for assembling optical interconnections using a staged optic component processing system having a plurality of processing stages, comprising:
   preparing an end of at least one fiber optic cable to accept at least one optical component thereon;
   attaching the at least one optical component on the end of the at least one fiber optic cable;
   polishing an optical interface of the at least one optical component; and
   transporting the at least one optical component and the at least one fiber optic cable on an optical component transport system between a plurality of processing stages configured to conduct the preparing, attaching and polishing steps.

49. The method of claim 48, wherein transporting comprises carrying the at least one optical component within at least one storage apparatus.

50. The method of claim 48, wherein transporting comprises moving the at least one optical component to a preparing stage on the optical component transport system.

51. The method of claim 48, wherein transporting comprises moving the at least one optical component between a preparing stage and an attaching stage on the optical component transport system.

52. The method of claim 48, wherein transporting comprises moving the at least one optical component from an attaching stage to a polishing stage on the optical component transport system.

53. The method of claim 48, further comprising transferring the at least one optical component from one of a plurality of storage apparatuses to the at least one fiber optic cable prior to the preparing step.

54. The method of claim 48, wherein preparing an end of the fiber optic cable comprises heating the at least one fiber optic cable and stripping an outer coating from the at least one fiber optic cable to expose a fiber optic cladding and a core.

55. The method of claim 48, wherein attaching the at least one optical component comprises rotating a component attachment assembly having at least one of the plurality of the components thereon into an attachment position.

56. The method of claim 55, further comprising rotating and inserting an axial opening of the at least one optical component onto an exposed core of the fiber optic cable.

57. The method of claim 48, further comprising after attaching the at least one optical component and trimming a protruding length of the at least one fiber optic cable adjacent an optical interface.

58. The method of claim 57, wherein trimming comprises burning the protruding length of the at least one fiber optic cable by directing at least one laser beam onto the protruding length.

59. The method of claim 58, wherein directing comprises splitting the at least one laser beam into at least a first and second laser beam wherein the first laser beam is directed about orthogonal to the protruding length of the at least one fiber optic cable and the second beam is directed about aligned with a longitudinal axis of the protruding length of the at least one fiber optic cable.

60. The method of claim 48, wherein polishing an optical interface of the at least one optical component comprises:
   rotating a polishing apparatus comprising a polishing table and a polishing material supply apparatus in an orbital motion;
   providing from the polishing material apparatus a renewable web of polishing material positioned adjacent the polishing table; and
   maintaining a polishing pressure of a surface of the at least one optical component against the web of polishing material and against the polishing table to polish the surface.

61. The method of claim 60, further comprising aligning the renewable web of polishing material received from the polishing material apparatus on the polishing table by aligning the polishing table to define a polishing plane generally aligned and about orthogonal to the surface.

62. The method of claim 60, wherein polishing the surface comprises providing a flexible polishing surface on the polishing table and pressing the surface against the web of polishing material supported by the flexible polishing surface.

63. The method of claim 60, wherein maintaining the polishing pressure comprises detecting and adjusting the polishing pressure to a predetermined value.

64. The method of claim 48, further comprising testing a first optical component, wherein testing includes activating a second component attached to the first optical component.

65. The method of claim 64, wherein activating comprises providing bias power and stimulation signals to the second component and determining if the first or second components are defective.

* * * * *